(12) United States Patent
Aoyama et al.

(10) Patent No.: US 10,675,754 B2
(45) Date of Patent: Jun. 9, 2020

(54) ROBOT SYSTEM

(71) Applicant: Seiko Epson Corporation, Tokyo (JP)

(72) Inventors: Ichiro Aoyama, Shiojiri (JP); Yasuhiko Asano, Chino (JP); Makoto Ishida, Chino (JP); Shintaro Dobashi, Kai (JP); Hiroyuki Miyano, Hara (JP); Toru Igarashi, Sakata (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/886,988

(22) Filed: Feb. 2, 2018

(65) Prior Publication Data

US 2018/0222041 A1     Aug. 9, 2018

(30) Foreign Application Priority Data

Feb. 6, 2017 (JP) ................. 2017-019307

(51) Int. Cl.
*B25J 9/04*       (2006.01)
*B25J 9/00*       (2006.01)
*B25J 21/00*      (2006.01)

(52) U.S. Cl.
CPC ............ *B25J 9/043* (2013.01); *B25J 9/0018* (2013.01); *B25J 9/0072* (2013.01); *B25J 9/0084* (2013.01); *B25J 9/0093* (2013.01); *B25J 9/0096* (2013.01); *B25J 9/042* (2013.01); *B25J 9/047* (2013.01); *B25J 21/00* (2013.01)

(58) Field of Classification Search
CPC ........ B25J 9/0018; B25J 9/0072; B25J 9/043; B25J 11/00
See application file for complete search history.

(56) References Cited

U.S. PATENT DOCUMENTS

| | | | |
|---|---|---|---|
| 9,114,538 B2* | 8/2015 | Fukudome | ........... B25J 17/0266 |
| 2007/0286712 A1* | 12/2007 | Rebstock | .......... H01L 21/67769 414/217 |
| 2008/0086237 A1* | 4/2008 | Rebstock | ........... G05B 19/4189 700/248 |
| 2012/0014768 A1* | 1/2012 | Miyashita | ......... H01L 21/67173 414/217 |
| 2014/0165907 A1 | 6/2014 | Furuya et al. | |

FOREIGN PATENT DOCUMENTS

| | | |
|---|---|---|
| JP | 2003-195919 A | 7/2003 |
| WO | WO-2013-030958 A1 | 3/2013 |

* cited by examiner

*Primary Examiner* — Ronald P Jarrett
(74) *Attorney, Agent, or Firm* — Harness, Dickey & Pierce, P.L.C.

(57) ABSTRACT

A robot system includes a first robot and a second robot, and the second robot has a base, a shaft provided translationally along an axis direction of a first axis on the base, and an arm provided rotatably with respect to the shaft, and the first robot can perform work on a work object that can be carried by the second robot.

20 Claims, 12 Drawing Sheets

ROBOT SYSTEM

BACKGROUND

1. Technical Field

The present invention relates to a robot system.

2. Related Art

Research and development of technologies for allowing robots to perform work are carried out.

In this regard, a robot system that allows a rotary arm for carrying an object to carry an object and a vertical articulated robot to perform work on the carried object is known (see Patent Document 1 (International Publication No. 2013/030958)).

Here, in the robot system of related art, the shape of the work region of the vertical articulated robot is a spherical shape and the shape of the work region of the rotary arm is a circular disc shape. The work region of the vertical articulated robot refers to a region in which the vertical articulated robot can perform work. The work region of the rotary arm refers to a region in which the rotary arm can perform work. Accordingly, in the robot system, as the installation position of the rotary arm is farther from the installation position of the vertical articulated robot, a region in which the work region of the vertical articulated robot and the work region of the rotary arm overlap is smaller. On the other hand, the degree of freedom of the work that can be performed with the cooperation of both the vertical articulated robot and the rotary arm is higher as the region in which the work region of the vertical articulated robot and the work region of the rotary arm overlap is larger. On this account, in the robot system, it may be difficult to make the degree of freedom of the work that can be performed in cooperation of both the vertical articulated robot and the rotary arm higher.

SUMMARY

An aspect of the invention is directed to a robot system including a first robot and a second robot, wherein the second robot has a base, a shaft provided translationally along an axis direction of a first axis on the base, and an arm provided rotatably with respect to the shaft, and the first robot can perform work on a work object that can be carried by the second robot.

According to the configuration, in the robot system, the first robot can perform work on the work object that can be carried by the second robot. Thereby, the robot system may improve the degree of freedom of the work that can be performed with the cooperation of both the first robot and the second robot.

In another aspect of the invention, the robot system may adopt a configuration in which the first robot is a horizontal articulated robot or vertical articulated robot.

According to this configuration, in the robot system, the vertical articulated robot or horizontal articulated robot can perform work on the work object that can be carried by the second robot. Thereby, the robot system may improve the degree of freedom of the work that can be performed with the cooperation of both the vertical articulated robot or horizontal articulated robot and the second robot.

In another aspect of the invention, the robot system may adopt a configuration in which the arm is rotatable about the first axis with respect to the shaft.

According to this configuration, in the robot system, the arm can rotate about the first axis with respect to the shaft. Thereby, the robot system may improve the degree of freedom of the work that can be performed with the cooperation of both the first robot and the second robot having the arm that can rotate about the first axis with respect to the shaft.

In another aspect of the invention, the robot system may adopt a configuration in which the axis direction of the first axis is a direction along the direction of gravitational force.

According to this configuration, in the robot system, the axis direction of the first axis is the direction along the direction of gravitational force. Thereby, the robot system may improve the degree of freedom of the work that can be performed with the cooperation of both the first robot and the second robot using the shaft provided translationally along the direction of gravitational force on the base.

In another aspect of the invention, the robot system may adopt a configuration in which the robot system includes a rack having a first surface and a second surface facing the first surface, and the first robot is provided on the first surface, and the second robot is provided on the second surface.

According to this configuration, in the robot system, the first robot is provided on the first surface of the rack, and the second robot is provided on the second surface of the rack. Thereby, the robot system may improve the degree of freedom of the work that can be performed with the cooperation of both the first robot provided on the first surface of the rack and the second robot provided on the second surface of the rack.

In another aspect of the invention, the robot system may adopt a configuration in which the base is movable.

According to this configuration, in the robot system, the base of the second robot is movable. Thereby, the robot system may further improve the degree of freedom of the work that can be performed with the cooperation of both the first robot and the second robot using the movable base.

In another aspect of the invention, the robot system may adopt a configuration in which the second robot includes the shaft in another part than an end portion on an opposite side to the base of end portions of the second robot.

According to this configuration, in the robot system, the second robot includes the shaft in the other part than the end portion on the opposite side to the base of the end portions of the second robot. Thereby, the robot system may further improve the degree of freedom of the work that can be performed with the cooperation of both the first robot and the second robot including the first movable unit in the other part than the end portion on the opposite side to the base of the end portions of the second robot.

In another aspect of the invention, the robot system may adopt a configuration in which the first robot has an nth (n is an integer equal to or larger than 1) arm rotatable about an nth rotation axis and an (n+1)th arm provided on the nth arm rotatably about an (n+1)th rotation axis in an axis direction different from an axis direction of the nth rotation axis, and the nth arm and the (n+1)th arm can overlap as seen from the axis direction of the (n+1)th rotation axis.

According to this configuration, in the robot system, in the first robot, as seen from the axis direction of the (n+1)th rotation axis, the nth arm and the (n+1)th arm can overlap. Thereby, the robot system may improve the degree of freedom of the work that can be performed with the cooperation of both the first robot in which the nth arm and the (n+1)th arm can overlap as seen from the axis direction of the (n+1)th rotation axis and the second robot.

In another aspect of the invention, the robot system may adopt a configuration in which a length of the nth arm is longer than a length of the (n+1)th arm.

According to this configuration, in the robot system, the length of the nth arm is longer than the length of the (n+1)th arm. Thereby, the robot system may further improve the degree of freedom of the work that can be performed with the cooperation of both the first robot in which the length of the nth arm is longer than the length of the (n+1)th arm and the second robot.

In another aspect of the invention, the robot system may adopt a configuration in which the nth arm (n is 1) is provided on the base.

According to this configuration, in the robot system, the nth arm is provided on the base of the first robot. Thereby, the robot system may further improve the degree of freedom of the work that can be performed with the cooperation of both the first robot in which the nth arm is provided on the base and the second robot.

In another aspect of the invention, the robot system may adopt a configuration in which the robot system includes a first production line having a plurality of first racks and a second production line having a plurality of second racks, and the first robot and the second robot are provided on at least one of the plurality of first racks and the plurality of second racks, and a feed plane through which feeding of the first production line is performed faces a feed plane through which feeding of the second production line is performed.

According to this configuration, in the robot system, the feed plane through which feeding of the first production line is performed faces the feed plane through which feeding of the second production line is performed. Thereby, the robot system may feed to both the first production line and the second production line through between the first production line and the second production line, and, as a result, times for feeding to both the first production line and the second production line may be made shorter.

In another aspect of the invention, the robot system may adopt a configuration in which the first robots and the second robots are provided on the plurality of first racks and the plurality of second racks.

According to this configuration, in the robot system, the first robots and the second robots are provided on the plurality of first racks of the first production line and the plurality of second racks of the second production line. Thereby, the robot system may improve the degree of freedom of the work that can be performed with the cooperation of both the first robot and the second robot in each of the plurality of first racks and each of the plurality of second racks.

In another aspect of the invention, the robot system may adopt a configuration in which the robot system includes a third production line having a plurality of third racks, and a plane facing the feed plane of the second production line faces a plane facing a feed plane through which feeding of the third production line is performed.

According to this configuration, in the robot system, the plane facing the feed plane of the second production line faces the plane facing the feed plane through which feeding of the third production line is performed. Thereby, in the robot system, a user may perform predetermined work on the respective first production line to third production line without interferences with a human, apparatus, or the like that feed to both the first production line and the second production line.

As descried above, in the robot system, the first robot can perform work on the work object that can be carried by the second robot. Thereby, the robot system may improve the degree of freedom of the work that can be performed with the cooperation of both the first robot and the second robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

As below, an embodiment of the invention will be explained with reference to the drawings.

Configuration of Robot System

Figure 1:
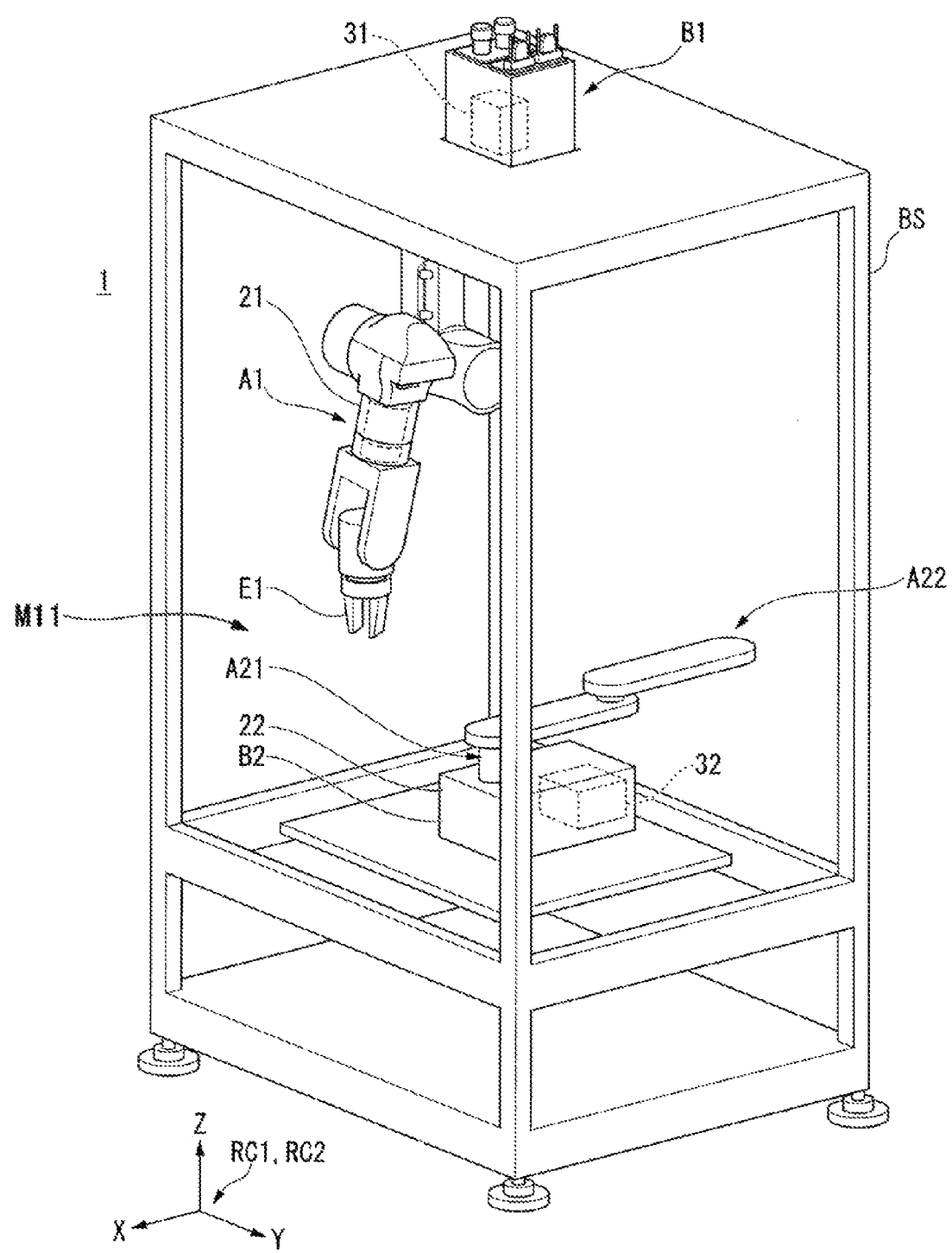
FIG. 1 shows an example of a configuration of a robot system 1 according to an embodiment.

First, referring to FIGS. 1 to 6, a configuration of a robot system 1 will be explained. FIG. 1 shows an example of the configuration of the robot system 1 according to the embodiment.

The robot system 1 includes e.g. a rack BS, a first robot 21, and a second robot 22. Note that, additionally, the robot system 1 may have other apparatuses including a carrying apparatus that carries objects (e.g. another robot for carrying, a belt conveyer, or the like) and an imaging unit (i.e., a camera separately provided from the respective first robot 21 and second robot 22).

Hereinafter, for convenience of explanation, the direction of gravitational force (vertically downward direction) is referred to as "downward direction" or "lower" and the direction opposite to the downward direction is referred to as "upward direction" or "upper". As below, as an example, the case where the downward direction coincides with a negative direction of a Z-axis in a first robot coordinate system RC1 as a robot coordinate system of the first robot 21 and coincides with a negative direction of a Z-axis in a second robot coordinate system RC2 as a robot coordinate system of the second robot 22 will be explained. Further, as below, as an example, the case where the respective coordinate axes of the first robot coordinate system RC1 coincide with the respective coordinate axes of the second robot coordinate system RC2 as shown in FIG. 1 will be explained. Note that the downward direction may not necessarily coincide with the negative directions of the Z-axes in the respective first robot coordinate system RC1 and second robot coordinate system RC2. Or, the respective coordinate axes of the first robot coordinate system RC1 may not necessarily coincide with the respective coordinate axes of the second robot coordinate system RC2. Or, the origin of the first robot coordinate system RC1 may coincide with the origin of the second robot coordinate system RC2 or not. In the example shown in FIG. 1, the origin of the first robot coordinate system RC1 coincides with the origin of the second robot coordinate system RC2.

The rack BS is e.g. a metal frame in a rectangular parallelepiped shape. Note that the shape of the rack BS may be another shape such as a circular column shape in place of the rectangular parallelepiped shape. The material of the rack BS may be another material such as resin in place of the metal. A flat board is provided as a ceiling board in the uppermost part as an uppermost end part of the end parts of the rack BS. A flat board is provided as a bottom board in the lowermost part as a lowermost end part of the end parts of the rack BS. Further, the rack BS is installed on an installation surface. The installation surface is e.g. a floor surface. Note that the installation surface may be another surface such as a wall surface, the ground, or a ceiling surface in place of the floor surface. Here, the bottom area of the rack BS is e.g. about 1000×1000 square millimeters or less. Note that it is desirable that the bottom area is equal to or smaller than 600×600 square millimeters. Thereby, when work performed by a human is replaced by work by the robot system 1, if the rack BS is installed, the rack BS may be prevented from exclusively using an area larger than the area exclusively used by the human for performing the work.

In the robot system 1, the first robot 21 and the second robot 22 are installed in the rack BS so that the work regions of the robots may overlap inside of the rack BS. Thereby, the robot system 1 may allow the first robot 21 and the second robot 22 to perform work that can be performed with the cooperation of both the first robot 21 and the second robot 22. The work that can be performed with the cooperation of both the first robot 21 and the second robot 22 is e.g. work by the first robot 21 processing, painting, application of grease or the like, assembly of another object, etc. on an object carried by the second robot 22. Note that the work that can be performed with the cooperation of both the first robot 21 and the second robot 22 may be other work performed with cooperation of both the first robot 21 and the second robot 22 instead.

For example, the first robot 21 is installed on the ceiling board so that the entire work region of the first robot 21 may be located below the ceiling board of the rack BS. In this case, the second robot 22 is installed on an installation board provided in the rack BS below the ceiling board so that at least a part of the work region of the second robot 22 may overlap with the work region of the first robot 21. Here, the upper surface of the installation board faces the lower surface of the ceiling board. That is, the second robot 22 is installed on the installation board so that the work region of the second robot 22 may be located above the installation board. Here, the work region of the first robot 21 refers to a region in which the first robot 21 can perform work. The work region of the second robot 22 refers to a region in which the second robot 22 can perform work. Note that the position in which the first robot 21 is installed inside of the rack BS may be another position of the rack BS in place of the ceiling board. In this case, the second robot 22 is installed in a position according to the position in which the first robot 21 is installed. The lower surface of the ceiling board, i.e., the lower surface on which the first robot 21 is installed is an example of a first surface. Further, the upper surface of the installation board, i.e., the upper surface of the installation board on which the second robot 22 is installed is an example of a second surface. Note that the work region of the first robot 21 may include an outside of the rack BS. Further, the work region of the second robot 22 may include an outside of the rack BS.

The rack BS has the feed plane M11. The feed plane M11 is a plane through which a work object is fed by a feeder such as an AGV (Automated Guided Vehicle) or a human of the side surfaces of the rack BS. The work object is an object on which both the first robot 21 and the second robot 22 perform work in cooperation. Further, in the example, the work object can be carried by the second robot 22. Note that it may be impossible for the second robot 22 to carry the work object instead. The feed plane M11 is predetermined with respect to the rack BS. Accordingly, one or both of the first robot 21 and the second robot 22 are installed in positions according to both the work performed with the cooperation of both the first robot 21 and the second robot 22 and the feed plane M11 in the rack BS.

The first robot 21 is a single-arm robot including a base B1, a movable unit A1 supported by the base B1, and a robot control apparatus 31. The single-arm robot is a robot having a single arm like the movable unit A1 in the example. Note that the first robot 21 may be a multi-arm robot in place of the single-arm robot. The multi-arm robot is a robot having two or more arms (e.g. two or more movable units A1). Of the multi-arm robots, a robot having two arms is also called a dual-arm robot. That is, the first robot 21 may be a dual-arm robot having two arms or a multi-arm robot having three or more arms (e.g. three or more movable units A1). Or, the first robot 21 may be another robot such as a scalar robot (horizontal articulated robot), Cartesian coordinate robot, or cylindrical robot. The Cartesian coordinate robot is e.g. a gantry robot.

Figure 2:
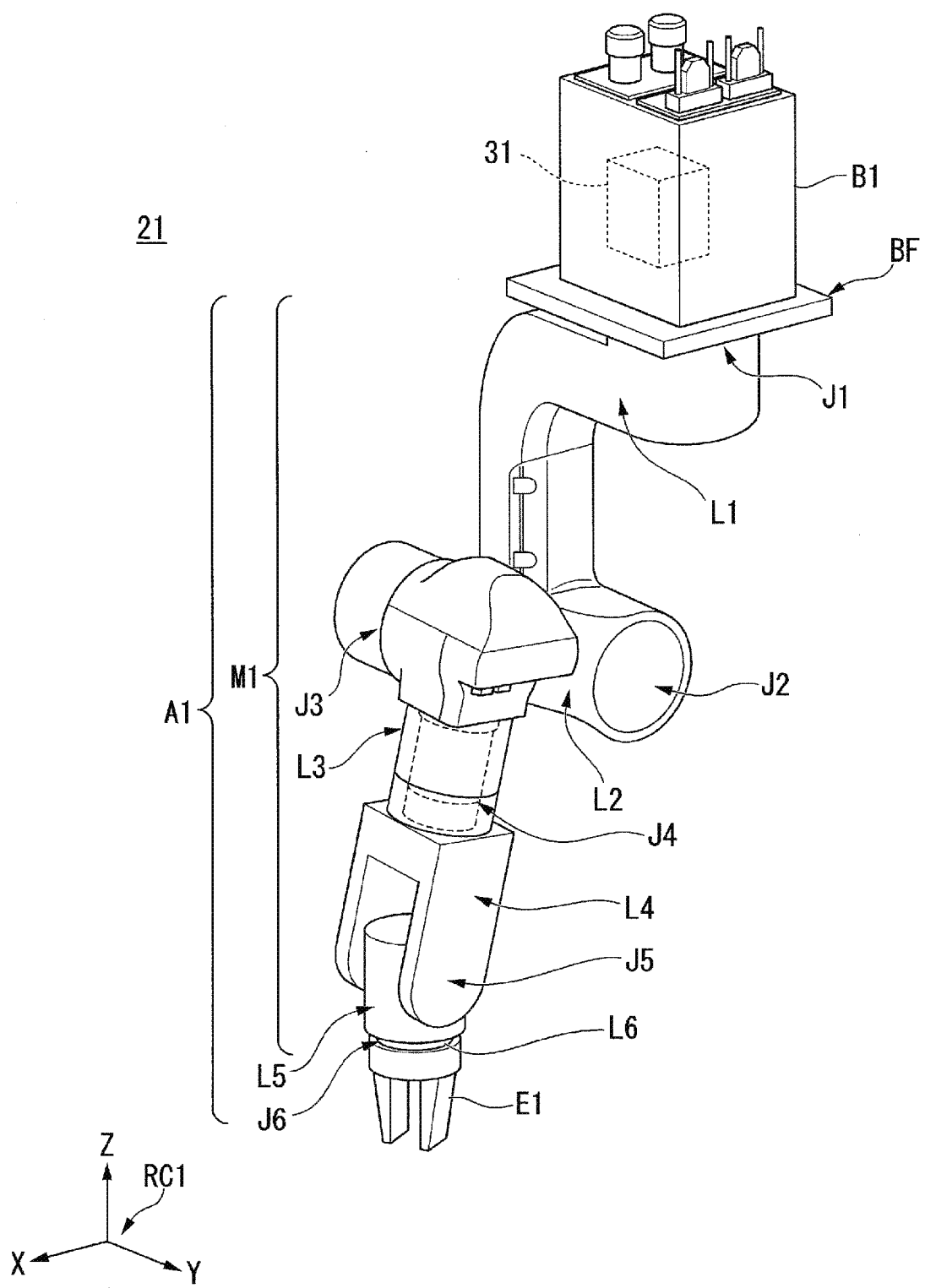
FIG. 2 shows an example of a configuration of a first robot 21.

Here, referring to FIG. 2, the first robot 21 will be explained. FIG. 2 shows an example of a configuration of the first robot 21.

The shape of the base B1 is e.g. a nearly rectangular parallelepiped shape with the longitudinal direction along the upward and downward directions. The base B1 is hollow. A flange BF is provided on one of the surfaces of the base B1. Further, the movable unit A1 is provided on the flange BF. That is, the base B1 supports the movable unit A1 by the flange BF. The shape of the base B1 may be another shape that can support the movable unit A1 such as a cubic shape, circular columnar shape, polyhedral shape in place of that shape.

Hereinafter, for convenience of explanation, the surface on which the flange BF is provided of the surfaces of the base B1 is referred to as "upper surface" and the surface opposite to the surface on which the flange BF is provided of the surfaces of the base B1 is referred to as "lower surface". For example, the base B1 is placed on the ceiling board so that the direction from the lower surface of the base B1 toward the upper surface of the base B1 may coincide with the downward direction, that is, the entire work region of the first robot 21 may be located below the ceiling board. Specifically, for example, an opening portion (not shown) penetrating in the upward and downward directions into which the base B1 can be inserted is formed in the ceiling board. The opening portion is smaller than the flange BF. A user fastens the flange BF and the ceiling board with a plurality of bolts, and thereby, the base B1 may be placed (mounted) on the ceiling board. That is, pluralities of through holes into which the plurality of bolts are respectively inserted are formed in the respective flange BF and ceiling board. Note that the base B1 may be placed in another position of the rack BS. Or, the fastening method of the flange BF and the ceiling board may be another method.

The movable unit A1 includes a manipulator M1 and an end effector E1. Note that the movable unit A1 may additionally include another apparatus such as an imaging unit. Further, the movable unit A1 may include only the manipulator M1.

The manipulator M1 includes first arm L1 to sixth arm L6 as six arms and joint J1 to joint J6 as six joints. The base B1 and the first arm L1 are coupled by the joint J1. The first arm L1 and the second arm L2 are coupled by the joint J2. The second arm L2 and the third arm L3 are coupled by the joint J3. The third arm L3 and the fourth arm L4 are coupled by the joint J4. The fourth arm L4 and the fifth arm L5 are coupled by the joint J5. The fifth arm L5 and the sixth arm L6 are coupled by the joint J6. That is, the movable unit A1 having the manipulator M1 is an arm of six-axis vertical articulated type. In other words, the first robot 21 is a vertical articulated robot. Note that the movable unit A1 may be adapted to act with the degree of freedom of five or less axes or act with the degree of freedom of seven or more axes.

The first arm L1 is rotatable about a first rotation axis AX1 (e.g. see FIG. 3) as a rotation axis of the joint J1. The second arm L2 is rotatable about a second rotation axis AX2 (e.g. see FIG. 3) as a rotation axis of the joint J2. The third arm L3 is rotatable about a third rotation axis AX3 (e.g. see FIG. 3) as a rotation axis of the joint J3. The fourth arm L4 is rotatable about a fourth rotation axis AX4 (e.g. see FIG. 3) as a rotation axis of the joint J4. The fifth arm L5 is rotatable about a fifth rotation axis AX5 (e.g. see FIG. 3) as a rotation axis of the joint J5. The sixth arm L6 is rotatable about a sixth rotation axis AX6 (e.g. see FIG. 3) as a rotation axis of the joint J6.

Figure 3:
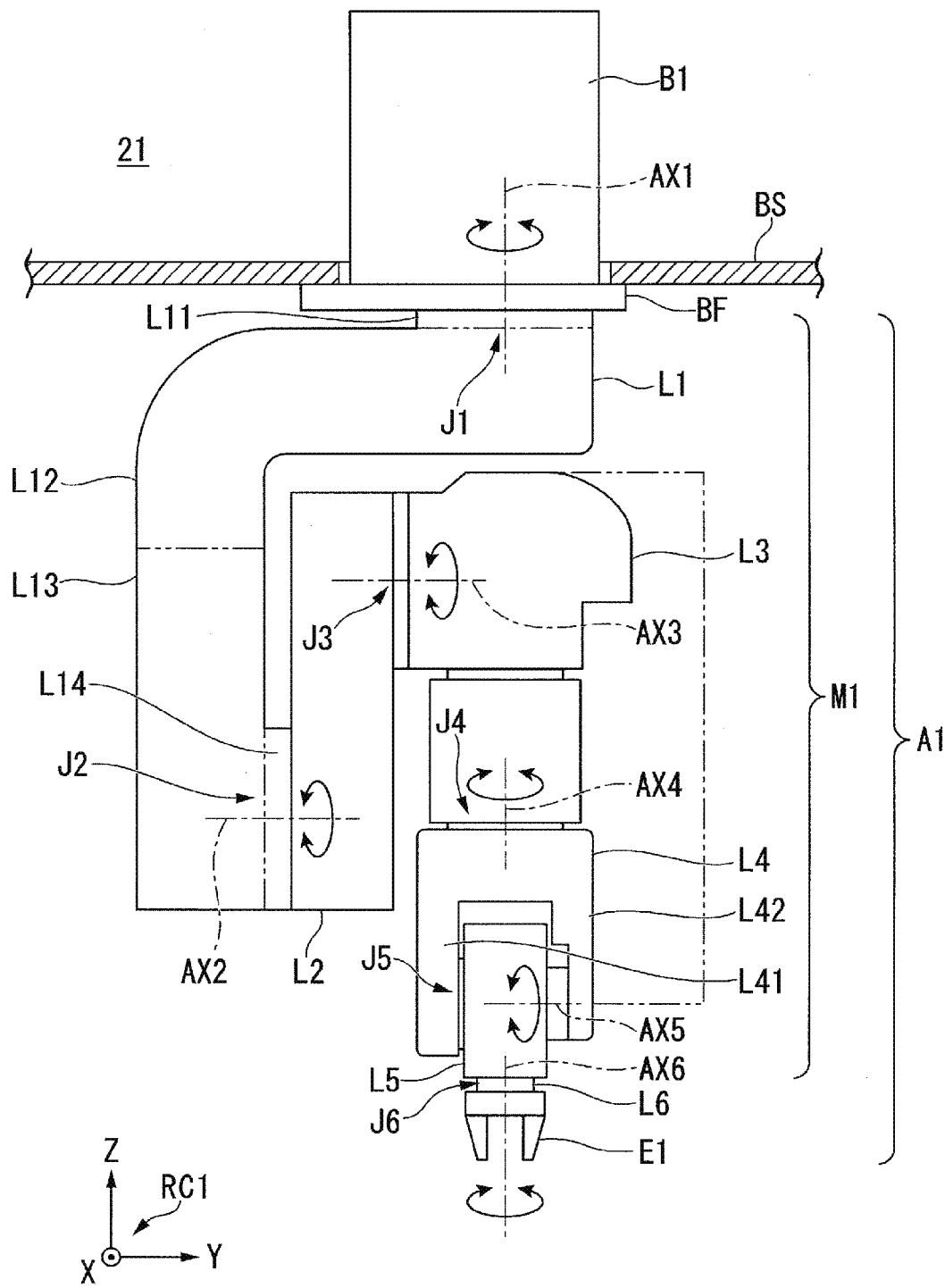
FIG. 3 shows an example of a side view of the first robot 21 shown in FIGS. 1 and 2.
Figure 4:
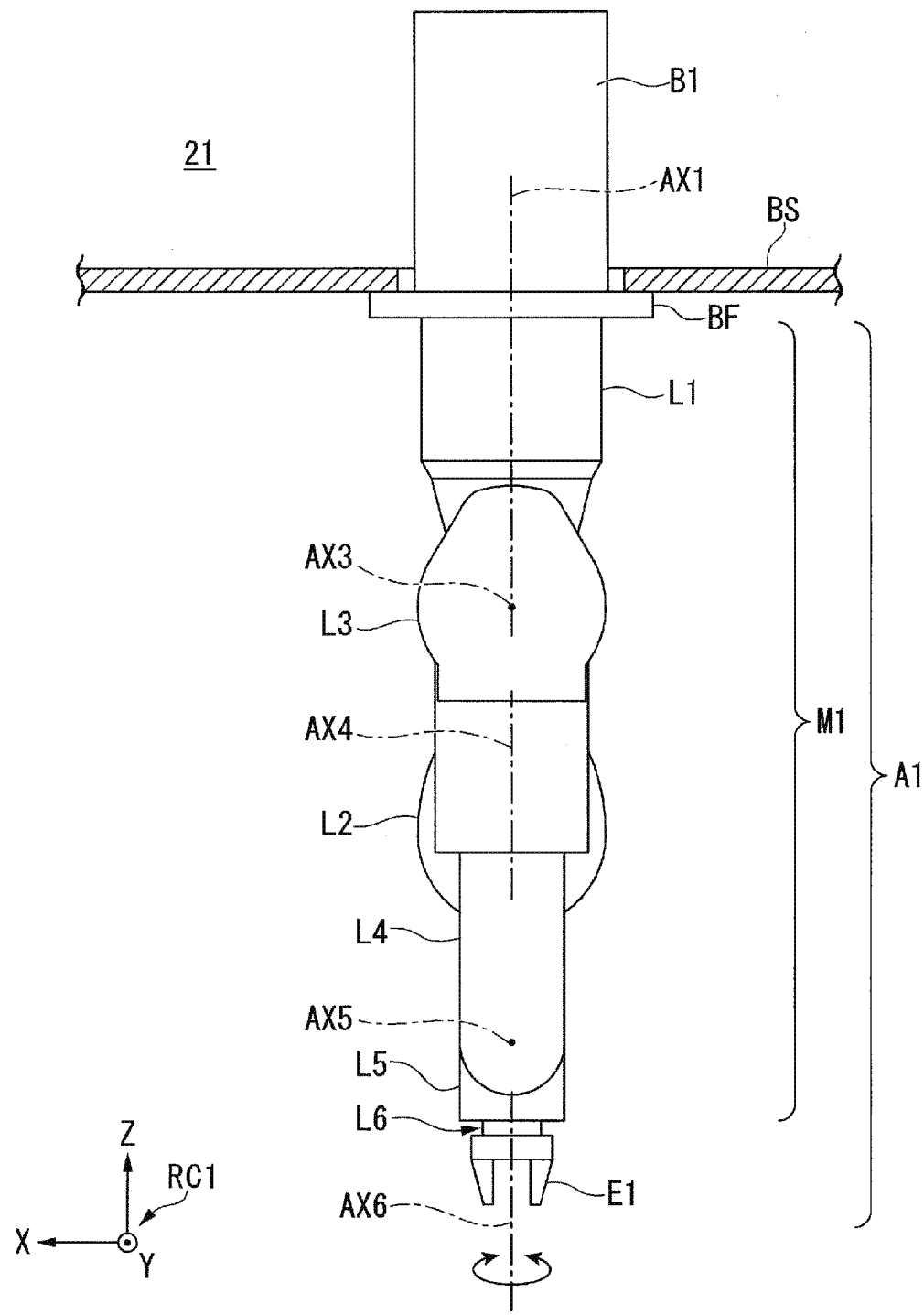
FIG. 4 shows an example of a front view of the first robot 21 when the first robot 21 shown in FIG. 3 is seen from a positive direction of a Y-axis in a negative direction of the Y-axis in a first robot coordinate system RC1.
Figure 5:
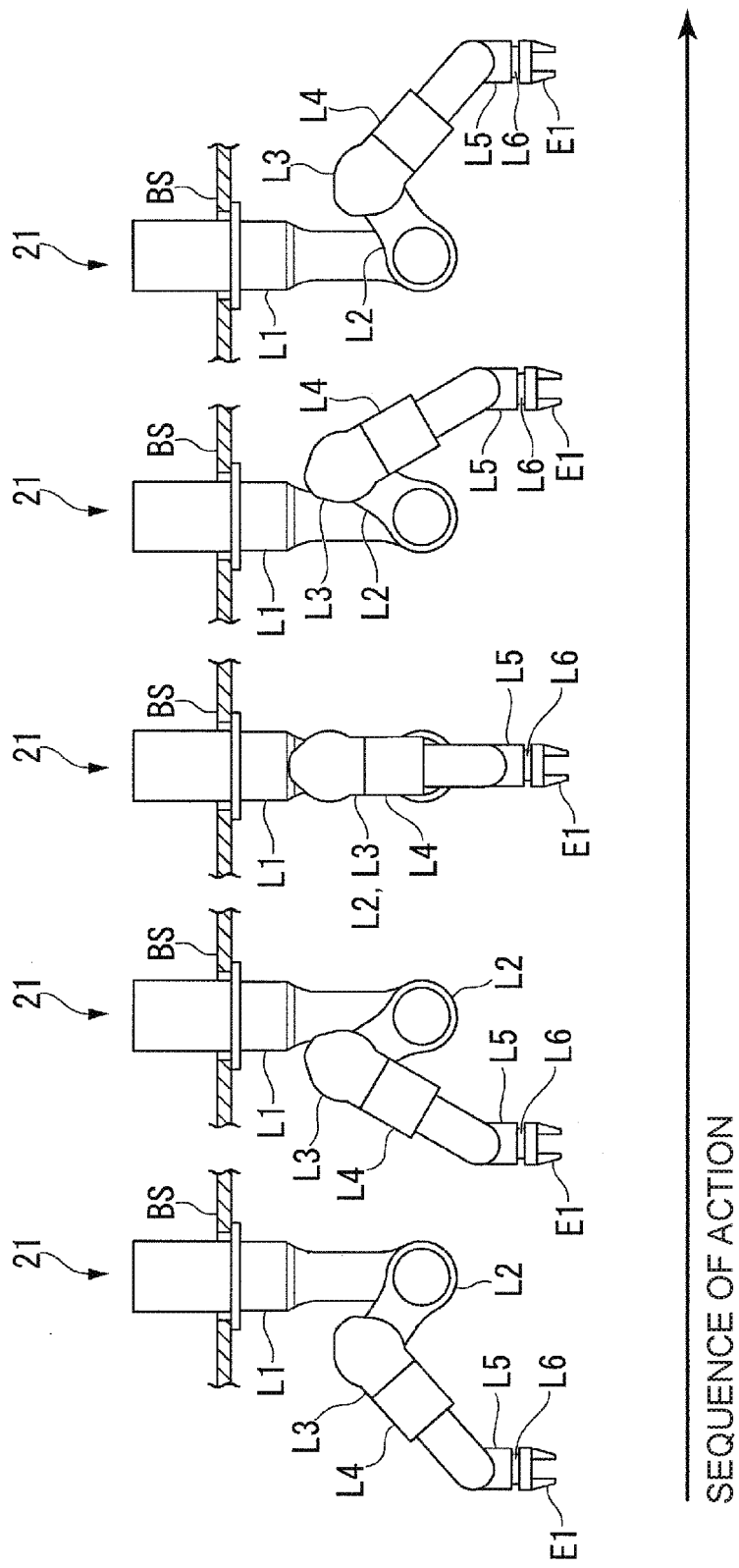
FIG. 5 is a diagram for explanation of an action via a compact state of actions of a manipulator M1.

Here, referring to FIGS. 3 to 5, the manipulator M1 is explained in further details. FIG. 3 shows an example of a side view of the first robot 21 shown in FIGS. 1 and 2.

As shown in FIG. 3, the direction from the lower surface of the base B1 toward the upper surface of the base B1 coincides with the downward direction, and thus, the joint J2 is located below the joint J1. The joint J2 is not located on the extension of the first rotation axis AX1. This is because the shape of the first arm L1 is a bent shape. In the example, the shape of the first arm L1 is a shape rounded and curved nearly in an L-shape when the first robot 21 is seen from the positive direction in the negative direction of the X-axis in the first robot coordinate system RC1. Specifically, the first arm L1 includes parts L11 to L14 as four parts. The part L11 refers to a part extending downward from the base B1 along the first rotation axis AX1 of the four parts forming the first arm L1. The part L12 refers to a part extending in the negative direction of the Y-axis in the first robot coordinate system RC1 from the lower end of the part L11 along the second rotation axis AX2 of the four parts. The part L13 refers to a part extending downward from the opposite end portion to the part L11 of the end portions of the part L12 along the first rotation axis AX1 of the four parts. The part L14 refers to a part extending in the positive direction of the Y-axis from the opposite end portion to the part L12 of the end portions of the part L13 along the second rotation axis AX2 of the four parts. Here, the parts L11 to L14 may integrally form the first arm L1 or separately form the first arm L1. Further, in FIG. 3, the part L12 and the part L13 are nearly orthogonal when the first robot 21 is seen along the X-axis in the first robot coordinate system RC1.

The shape of the second arm L2 is an elongated shape. The second arm L2 is connected to the distal end portion of the first arm L1, i.e., the opposite end portion to the part L13 of the end portions of the part L14.

The shape of the third arm L3 is an elongated shape. The third arm L3 is connected to the opposite end portion to the end portion connected to the first arm L1 of the end portions of the second arm L2.

The fourth arm L4 is connected to the distal end portion of the third arm L3, i.e., the opposite end portion to the end portion connected to the second arm L2 of the end portions of the third arm L3. In the fourth arm L4, a supporting portion L41 and a supporting portion L42 as a pair of supporting portions opposed to each other are formed. The supporting portion L41 and the supporting portion L42 are used for the connection for the fourth arm L4 to the fifth arm L5. That is, the fourth arm L4 positions the fifth arm L5 between the supporting portion L41 and the supporting portion L42 and is connected to the fifth arm L5 by the supporting portion L41 and the supporting portion L42. Note that the fourth arm L4 is not limited to that, but may have a configuration that supports the fifth arm L5 by a single supporting portion (cantilever) or a configuration that supports the fifth arm L5 by three or more supporting portions.

As described above, the fifth arm L5 is located between the supporting portion L41 and the supporting portion L42 and connected to the supporting portion L41 and the supporting portion L42.

The shape of the sixth arm L6 is a flat plate-like shape. That is, the sixth arm L6 is a flange. The sixth arm L6 is connected to the opposite end portion to the fourth arm L4 of the end portions of the fifth arm L5. Further, the end effector E1 is connected to the sixth arm L6.

In the example, of the rotation axes of the respective six joints of the manipulator M1, the second rotation axis AX2 and the third rotation axis AX3 are parallel to each other. Note that the second rotation axis AX2 and the third rotation axis AX3 may be non-parallel.

Note that, in the respective FIGS. 1 to 3, for simplification of the drawings, configurations including actuators, encoders, reducers, brakes provided in the respective joints J1 to J6 are omitted. The brakes may be electromagnetic brakes or mechanical brakes. Further, part or all of the joints J1 to J6 may have no reducers. Furthermore, part or all of the joints J1 to J6 may have no brakes.

Here, in the manipulator M1, the first arm L1 and the second arm L2 can overlap as seen from the axis direction of the first rotation axis AX1. In the manipulator M1, the first arm L1 and the second arm L2 can overlap as seen from the axis direction of the second rotation axis AX2. In the manipulator M1, the second arm L2 and the third arm L3 can overlap as seen from the axis direction of the second rotation axis AX2. In the manipulator M1, the fourth arm L4 and the fifth arm L5 can overlap as seen from the axis direction of the fourth rotation axis AX4. Note that, in the embodiment, overlapping of two arms when the two arms are seen from a direction shows that the rate of the area at which one arm of the two arms overlaps with the other is equal to or larger than a predetermined rate. The predetermined rate is e.g. 90 percent, but may be another rate. The manipulator M1 may be adapted so that the third arm L3 and the fourth arm L4 can overlap as seen from the axis direction of the third rotation axis AX3. Or, the manipulator M1 may be adapted so that the fifth arm L5 and the sixth arm L6 can overlap as seen from the axis direction of the fifth rotation axis AX5.

Here, in the manipulator M1, the joint J2 and the joint J3 are respectively rotated, and thereby, the state of the manipulator M1 may be brought into a compact state. In the example, the compact state refers to a state in which the the distance between the second rotation axis AX2 and the fifth rotation axis AX5 is shortest in the direction along the first rotation axis AX1 and the first rotation axis AX1 coincides with the fourth rotation axis AX4. That is, the state of the manipulator M1 shown in FIG. 3 is the compact state. When the first robot 21 shown in FIG. 3 is seen from the positive direction of the Y-axis in the negative direction of the Y-axis in the first robot coordinate system RC1, in the manipulator M1 in the compact state, as shown in FIG. 4, the three arms of the first arm L1, the second arm L2, and the third arm L3 overlap. FIG. 4 shows an example of a front view of the first robot 21 when the first robot 21 shown in FIG. 3 is seen from the positive direction of the Y-axis in the negative direction of the Y-axis in the first robot coordinate system RC1.

The state of the manipulator M1 may be brought into the compact state because the second arm L2 is formed in the shape and the size that do not interfere with the respective ceiling board of the rack BS and the first arm L1 by the rotation of the joint L2.

Here, in the example, when the state of the manipulator M1 is the compact state, in the direction along the first rotation axis AX1, the length of the first arm L1 is longer than the length of the second arm L2. Further, in this case, in the direction, the length of the second arm L2 is longer than the length of the third arm L3. In the case, in the direction, the length of the fourth arm L4 is longer than the length of the fifth arm L5. In the case, in the direction, the length of the fifth arm L5 is longer than the length of the sixth arm L6. Note that the respective lengths of the first arm L1 to sixth arm L6 may be other lengths instead.

The state of the manipulator M1 may be brought into the compact state, accordingly, as shown in FIG. 5, the manipulator M1 rotates the joint J2 without rotating the joint J1, and thereby, can move the position of the joint J6 to a position different by 180° about the first rotation axis AX1 via the compact state. FIG. 5 is a diagram for explanation of an action via the compact state of actions of the manipulator M1. In the example, the position of the joint J6 is shown by the position of the center of gravity of the joint J6. Note that the position of the joint J6 may be shown by another position associated with the joint J6 in place of the position of the center of gravity of the joint J6. More specifically, the manipulator M1 rotates the joint J2 without rotating the joint J1, and thereby, can move the sixth arm L6 as the distal end of the manipulator M1 from the left position shown on the left in FIG. 5 via the compact state to the right position shown on the right in FIG. 5 different by 180° about the first rotation axis AX1. Note that, in the action shown in FIG. 5, the sixth arm L6 moves in a straight line when the first robot 21 is seen from the direction along the first rotation axis AX1.

The total of the lengths of the third arm L3 to the sixth arm L6 is longer than the length of the second arm L2. Thereby, when the first robot 21 is seen from the direction along the second rotation axis AX2, if the state of the manipulator M1 is allowed to coincide with the compact state, the distal end of the sixth arm L6 may be projected from the second arm L2. As a result, when the end effector E1 is attached to the sixth arm L6, interferences of the end effector E1 with the first arm L1 and the second arm L2 may be suppressed.

As described above, the manipulator M1 rotates the second rotation axis AX2 without rotating the first rotation axis AX1, and thereby, may move the end effector E1 to a position different by 180° about the first rotation axis AX1 via the compact state. As a result, in the first robot 21, the end effector E1 may be efficiently moved and the space provided for preventing interferences of a part of the first robot 21 with other objects may be reduced.

Returning to FIG. 2, the actuators provided in the respective joints J1 to J6 of the manipulator M1 are communicably connected to the robot control apparatus 31 by cables. Thereby, the actuators operate the manipulator M1 based on control signals acquired from the robot control apparatus 31. Wired communications via the cables are performed according to standards of e.g. Ethernet (registered trademark), USB (Universal Serial Bus), or the like. Or, part or all of the actuators may be adapted to be connected to the robot control apparatus 31 via wireless communications performed according to communication standards of Wi-Fi (registered trademark) or the like.

The end effector E1 is an end effector having a claw part (finger part) that can grasp an object. Note that the end effector E1 may be another end effector having a suction part that can suction (hold) an object by air, a magnetic force, or the like in place of the end effector having the claw part.

The end effector E1 is communicably connected to the robot control apparatus 31 by a cable. Thereby, the end effector E1 performs actions according to the control signals acquired from the robot control apparatus 31. Wired communications via the cable are performed according to standards of e.g. Ethernet (registered trademark), USB, or the like. Or, the end effector E1 may be adapted to be connected to the robot control apparatus 31 via wireless communications performed according to communication standards of Wi-Fi (registered trademark) or the like.

The robot control apparatus 31 is a controller that controls the first robot 21. The robot control apparatus 31 operates the first robot 21 according to an operation program previously stored by the user. Thereby, the robot control apparatus 31 may allow the first robot 21 to perform work desired by the user.

In the example, the robot control apparatus 31 is provided inside of (built in) the base B1. Note that the robot control apparatus 31 may be externally provided separately from the first robot 21 instead. When the apparatus is externally provided separately from the first robot 21, the robot control apparatus 31 is communicably connected to the first robot 21 via wired or wireless connection.

Figure 6:
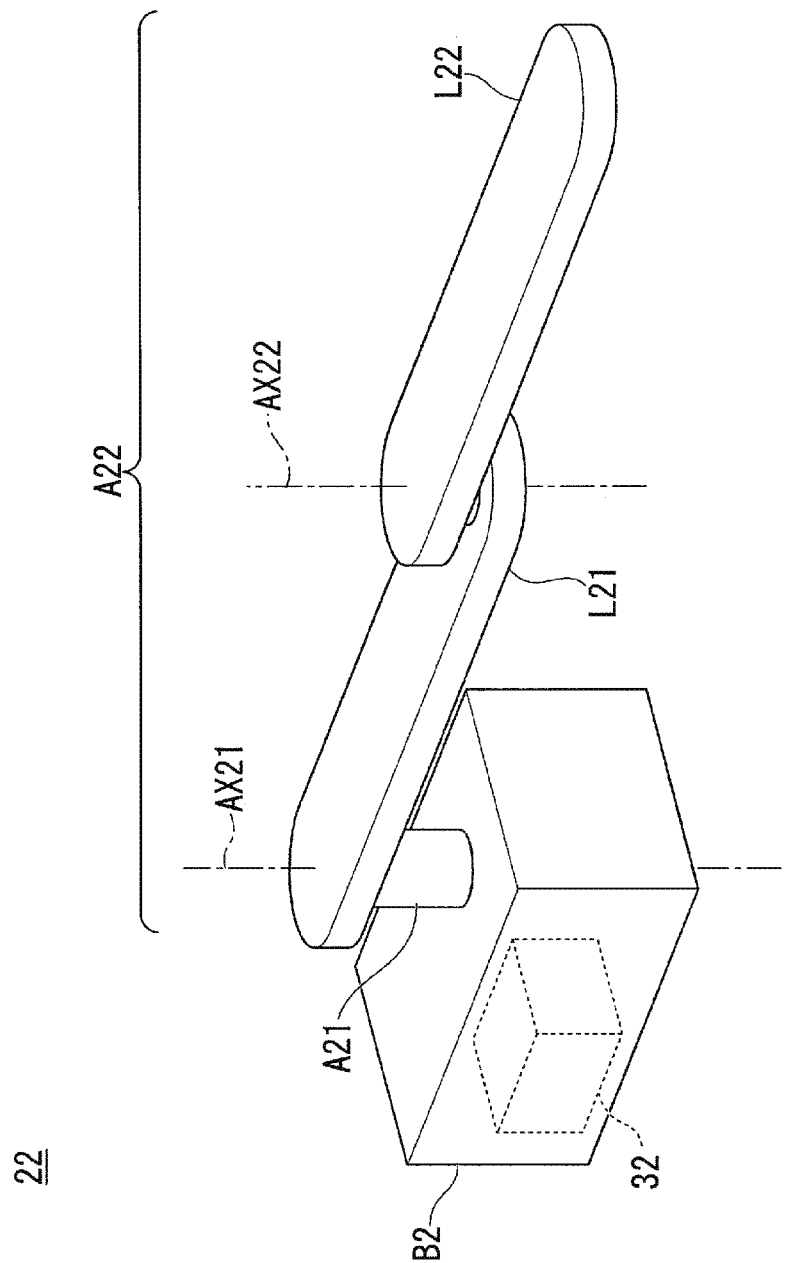
FIG. 6 shows an example of a configuration of a second robot 22.

Returning to FIG. 1, the second robot 22 is a scalar robot (horizontal articulated robot) including a base B2, a shaft (a first movable unit) A21 provided on the base B2 translationally along the direction of a first rotation axis AX21, a second movable unit A22 provided rotatably with respect to the first movable unit A21, and a robot control apparatus 32. Here, referring to FIG. 6, the second robot 22 is explained. FIG. 6 shows an example of a configuration of the second robot 22.

The base B2 is installed on the above described installation board. Note that a movement mechanism that can move (translate, slide) in the direction along the upper surface of the installation board may be provided in the base B2. In this case, the second robot 22 may move in the direction along the upper surface of the installation board with respect to the first robot 21. Thereby, the robot system 1 may set the size of the region in which the work region of the first robot 21 and the work region of the second robot 22 overlap to a size desired by the user. The base B2 has a nearly rectangular parallelepiped (or cubic) shape as an outer shape, and is formed by plate-like surfaces and hollow. Further, for example, the base B2 supports the second movable unit A22 on the upper surface of the base B2. Note that the shape of the base B2 may be another shape in place of that shape. A first motor (not shown) is provided inside of the base B2. For example, the first motor may translate (move up and down) the first movable unit A21 along the direction of the first rotation axis AX21 by rotating a ball screw nut provided on the outer circumference portion of a ball screw groove (not shown) formed in the circumference surface of the first movable unit A21 using a timing belt or the like.

In the example, the first movable unit A21 is an axial member in a cylindrical shape. In the example, as described above, the ball screw groove (not shown) is formed in the circumference surface of the first movable unit A21. The first movable unit A21 is provided to penetrate the upper surface of the base B2 in the direction of the first rotation axis AX21. In the example, the direction of the first rotation axis AX21 coincides with the direction along the Z-axis direction in the second robot coordinate system RC2 (in the example, the direction along the direction of gravitational force). Note that the direction of the first rotation axis AX21 may coincide with another direction not along the direction of gravitational force instead. The direction of the first rotation axis AX21 is an example of an axis direction of a first axis. Note that, for example, the first movable unit A21 may have another configuration such as a configuration provided to translationally move with respect to a side surface of the base B2 installed on a wall surface of the rack BS or the like in the direction along the Z-axis direction along the side surface.

The second movable unit A22 includes a first arm L21 supported rotatably about the first rotation axis AX21 by the first movable unit A21 and a second arm L22 supported rotatably about the second rotation axis AX22 by the first arm L21.

The shape of the first arm L21 is an elongated shape extending in a direction orthogonal to the first rotation axis AX21. In the example, the first arm L21 rotates about the first rotation axis AX21 with respect to the first movable unit A21 and moves in a horizontal direction. The horizontal direction is a direction orthogonal to the direction of the first rotation axis AX21. In the example, the horizontal direction is a direction along the XY-plane in the second robot coordinate system RC2. The first arm L21 is rotated about the first rotation axis AX21 by a second motor (not shown) provided in the first movable unit A21 (or first arm L21). That is, the first rotation axis AX21 is a rotation axis of the second motor.

The shape of the second arm L22 is an elongated shape extending in a direction orthogonal to the first rotation axis AX21. In the example, the second arm L22 rotates about the second rotation axis AX22 and moves in the horizontal direction. The second arm L22 is rotated about the second rotation axis AX22 by a third motor (not shown) provided in the second arm L22. That is, the second rotation axis AX22 is a rotation axis of the third motor.

Further, the second robot 22 contains the robot control apparatus 32 (not shown) in a space inside of the base B2.

Note that, in the second robot 22, the first movable unit A21 may be provided in a part between the end portion of on the base B2 side and the opposite end portion to the end portion of the end portions of the second movable unit A22. That is, the first movable unit A21 may be provided in another part than the opposite end portion to the end portion on the base B2 side of the end portions of the second movable unit A22. For example, the first movable unit A21 may be provided between the first arm L1 and the second arm L22. In this case, the first movable unit A21 can translate along the direction of the second rotation axis AX22. Further, in this case, the first arm L21 serves as a base that supports the first movable unit A21.

The robot control apparatus 32 is a controller that controls the second robot 22. Note that the robot control apparatus 32 may be externally provided separately from the second robot 22 in place of the configuration built in the second robot 22. When the apparatus is externally provided separately from the second robot 22, the robot control apparatus 32 is communicably connected to the second robot 22 via wired or wireless connection.

Overlapping Between Work Region of First Robot and Work Region of Second Robot

Figure 7:
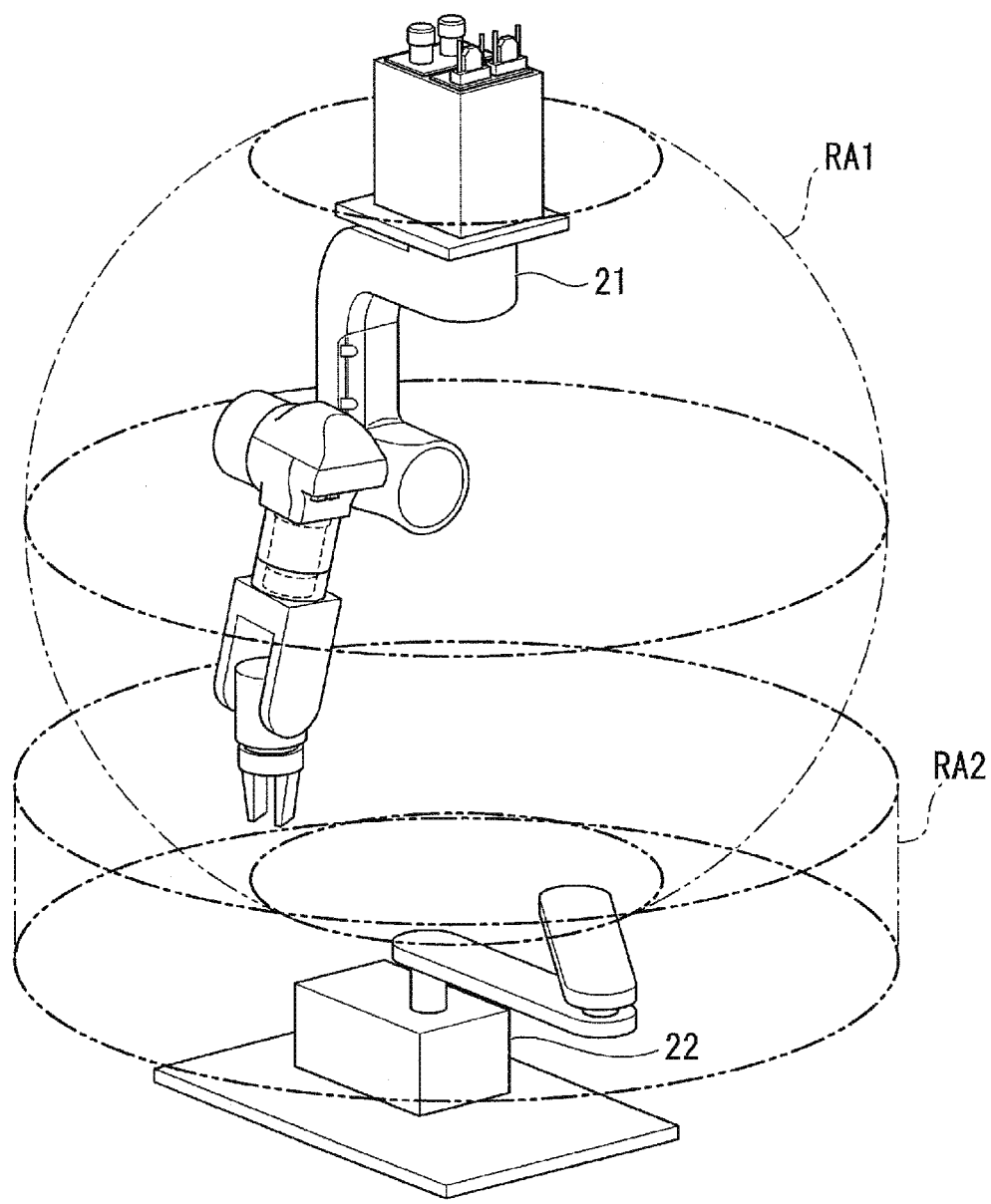
FIG. 7 shows an example of a state in which a work region of the first robot 21 and a work region of the second robot 22 overlap inside of a rack BS.

As below, referring to FIG. 7, overlapping between the work region of the first robot 21 and the work region of the second robot 22 will be explained. FIG. 7 shows an example of a state in which the work region of the first robot 21 and the work region of the second robot 22 overlap inside of the rack BS.

A spherical region RA1 shown in FIG. 7 is an example of the work region of the first robot 21. Further, a spherical region RA2 shown in FIG. 7 is an example of the work region of the second robot 22. The first robot 21 and the second robot 22 are respectively installed inside of the rack BS so that at least a part of the region RA1 may overlap with the region RA2 as shown in FIG. 7. Thereby, the first robot 21 and the second robot 22 may perform work in cooperation on a work object to be fed. For example, the second robot 22 carries the fed work object. In this case, the first robot 21 may perform some work on the work object carried by the second robot 22. Here, the work object may be e.g. an industrial component, member, device, or the like such as a bolt, nut, pin, plate, or container containing them. Note that the object may be a commodity component, member, device, or the like or container containing them, or biological object such as a cell or a container containing the biological object, or the like instead.

Usage Example 1 of Robot System

Figure 8:
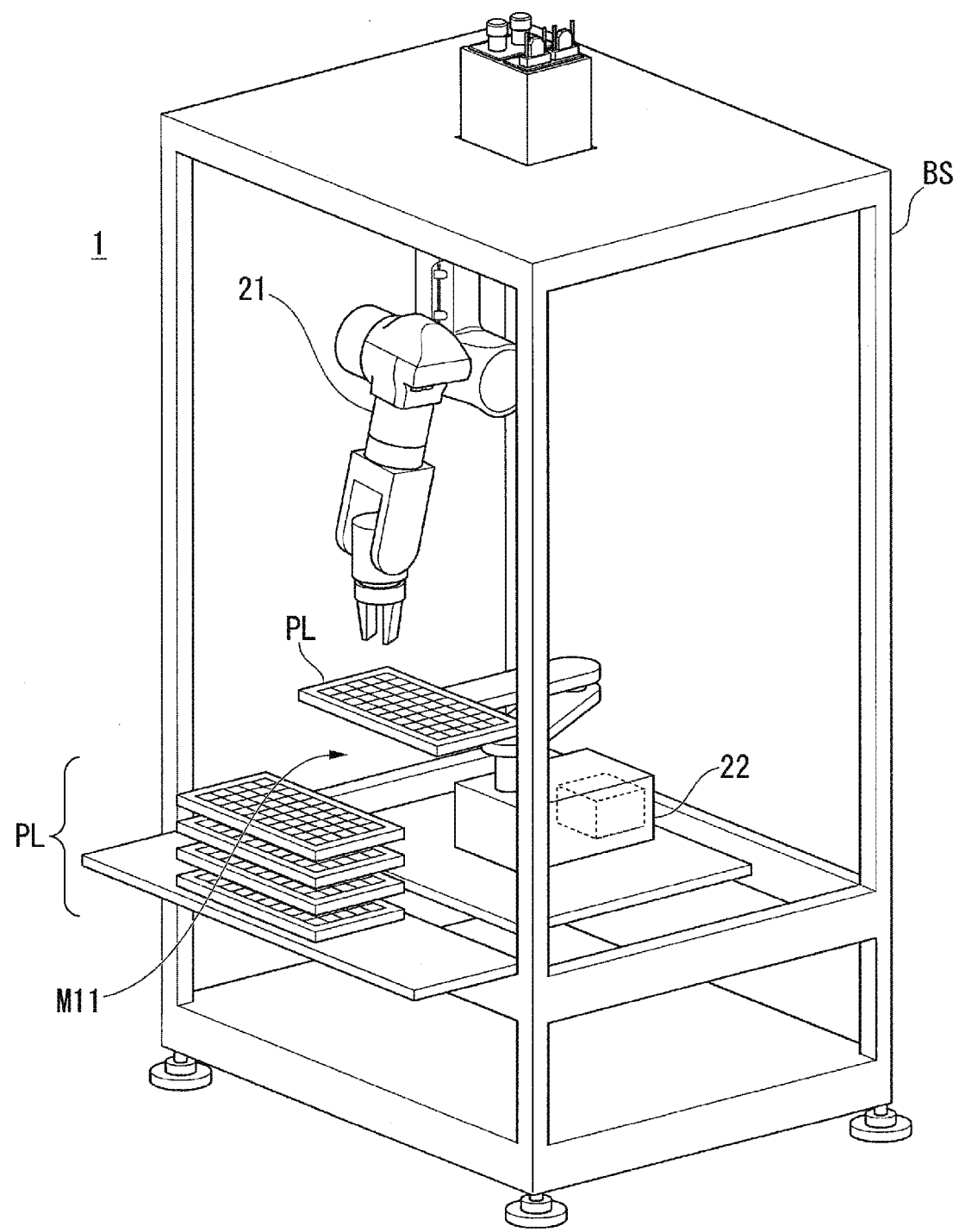
FIG. 8 shows an example of a state in which a plurality of pallets PL containing one or more work objects on which the first robot 21 performs work are fed by a feeder or the like on a feed plane M11 side of the rack BS and stacked.

As below, referring to FIG. 8, usage example 1 of the robot system 1 will be explained. For example, the robot system 1 is used as shown in FIG. 8. FIG. 8 shows an example of a state in which a plurality of pallets PL containing one or more work objects on which the first robot 21 performs work are fed by a feeder or the like on the feed plane M11 of the rack BS and stacked. Gaps into which the second arm L22 of the second robot 22 can be inserted are provided between the respective stacked plurality of pallets PL.

The second robot 22 moves the respective first movable unit A21 and second movable unit A22 and lifts the respective stacked plurality of pallets PL sequentially from the top by the second arm L22. In this regard, the second robot 22 inserts the second arm L22 into the gap between the pallet PL stacked on the top and the second pallet PL stacked next below. Then, the second robot 22 raises the first movable unit A21, and thereby, lifts the pallet PL stacked on the top by the second arm L22. The second robot 22 moves the lifted pallet PL to a predetermined work position. The predetermined work position may be any position in which the work region of the first robot 21 contains the entire pallet PL moved by the second robot 22.

The first robot 21 performs work on the respective one or more work objects contained in the pallet PL moved to the predetermined work position by the second robot 22. The work is e.g. application of grease, assembly with another object, or the like. Note that the work may be other work in place of that work. The first robot 21 finishes work on the respective one or more work objects, and then, the second robot 22 removes the lifted pallet PL to a predetermined removal region (not shown).

Usage Example 2 of Robot System

Figure 9:
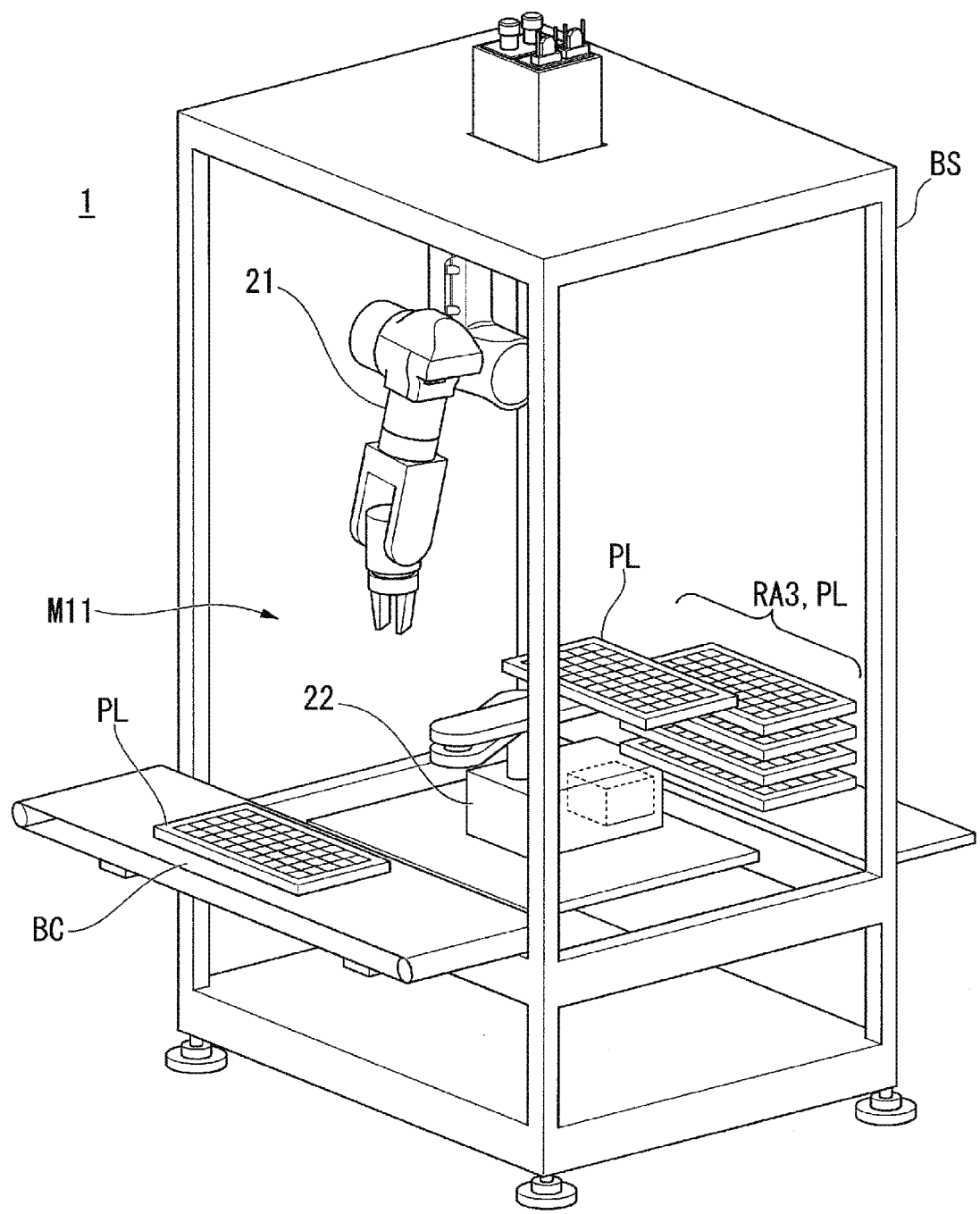
FIG. 9 shows an example of a state of the robot system 1 when the pallets PL containing one or more work objects on which the first robot 21 performs work are fed one by one by a belt conveyer BC.

As below, referring to FIG. 9, usage example 2 of the robot system 1 will be explained. For example, the robot system 1 can be used as shown in FIG. 9. FIG. 9 shows an example of a state of the robot system 1 when the pallets PL containing one or more work objects on which the first robot 21 performs work are fed one by one by a belt conveyer BC. A gap into which the second arm L22 of the second robot 22 can be inserted is provided between the pallet PL conveyed by the belt conveyer BC and a belt of the belt conveyer BC.

The second robot 22 moves the respective first movable unit A21 and second movable unit A22 and lifts the pallet PL fed by the belt conveyer BC by the second arm L22. In this regard, the second robot 22 inserts the second arm L22 into the gap between the pallet PL and the belt of the belt conveyer BC. Then, the second robot 22 raises the first movable unit A21, and thereby, lifts the pallet PL by the second arm L22. The second robot 22 moves the lifted pallet PL to a predetermined work position.

The first robot 21 performs work on the respective one or more work objects contained in the pallet PL moved to the predetermined work position by the second robot 22. The work is e.g. application of grease, assembly with another object, or the like. Note that the work may be other work in place of that work. The first robot 21 finishes work on the respective one or more work objects, and then, the second robot 22 removes the lifted pallet PL to a predetermined removal region RA3 shown in FIG. 9. In this regard, the second robot 22 removes the pallets PL so that the pallets PL may be stacked from bottom to top in the order of removal in the removal region RA3. In the example shown in FIG. 9, the pallets PL removed by the second robot 22 are stacked in the removal region RA3.

Usage Example 3 of Robot System

Figure 10:
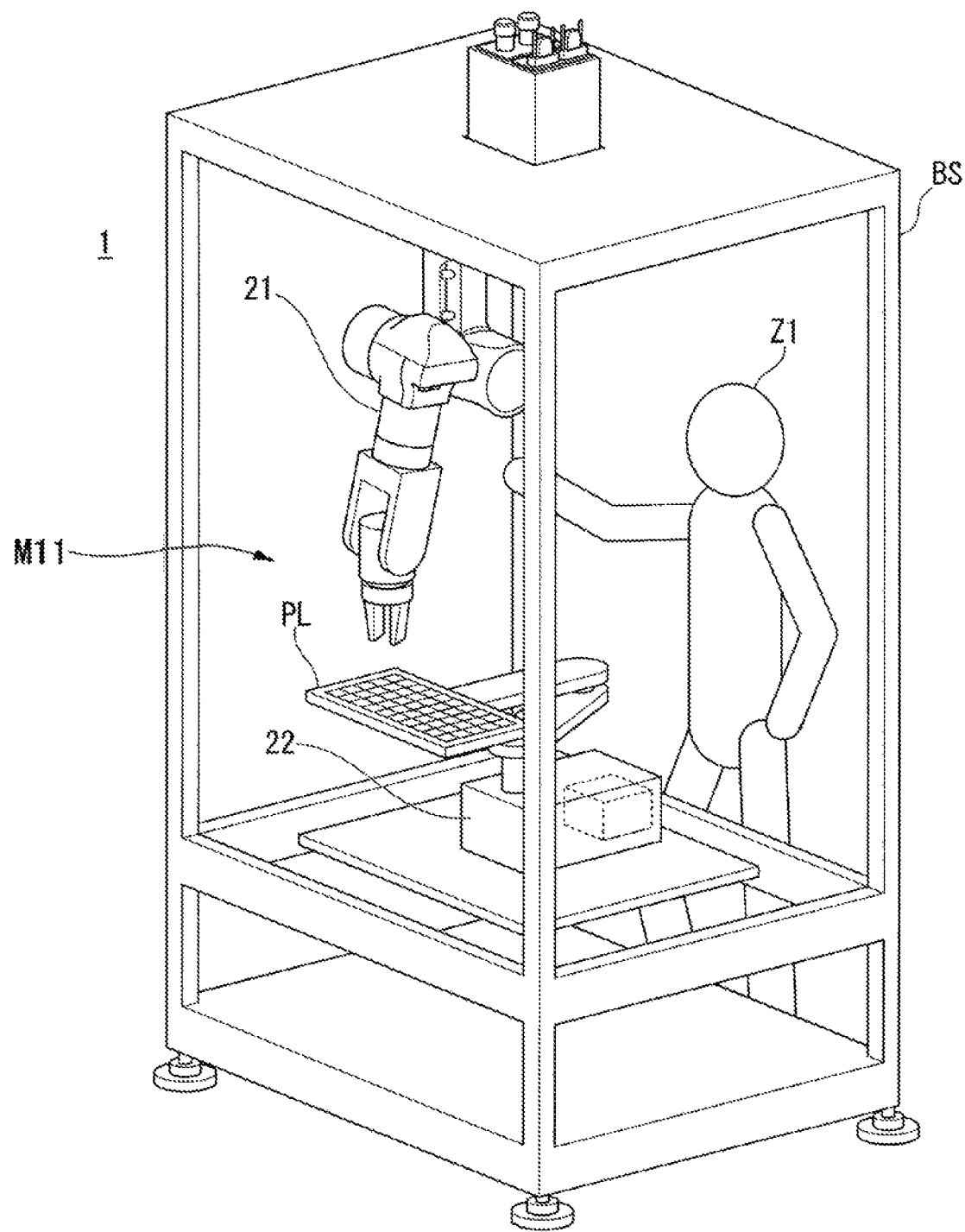
FIG. 10 shows an example of a state of the robot system 1 when the pallet PL is fed by a human.

As below, referring to FIG. 10, usage example 3 of the robot system 1 will be explained. For example, the robot system 1 can be used as shown in FIG. 10. FIG. 10 shows an example of a state of the robot system 1 when the pallet PL is fed by a human.

A worker Z1 shown in FIG. 10 is an example of a human who feeds the pallet PL to the second robot 22. The second robot 22 moves the second arm L22 to a predetermined feed position. The pallet PL is mounted by the human on the upper surface of the second arm L22 in the predetermined feed position. The pallet PL is mounted on the upper surface, and then, the second robot 22 moves the pallet PL to a predetermined work position.

The first robot 21 performs work on the respective one or more work objects contained in the pallet PL moved to the predetermined work position by the second robot 22. The work is e.g. application of grease, assembly with another object, or the like. Note that the work may be other work in place of that work. The first robot 21 finishes work on the respective one or more work objects, and then, the second robot 22 removes the lifted pallet PL to a predetermined removal region (not shown).

Here, in the respective usage examples 1 to 3 of the robot system 1 explained as above, the second robot 22 can translate the first movable unit A21 upward and downward, and thus, the user may make the space between the first robot 21 and the second robot 22 wider and the work region of the first robot 21 and the work region of the second robot 22 may overlap. As a result, the robot system 1 may improve the degree of freedom of the work that can be performed with the cooperation of both the first robot 21 and the second robot 22. For example, in the robot system 1, compared to the case of a robot system different from the robot system 1, a jig placed within the region in which the work region of the first robot 21 and the work region of the second robot 22 overlap can be placed in a position desired by the user. Further, in the robot system 1, the degree of freedom may be improved, and, compared to the robot system different from the robot system 1, a lot of work of various kinds of work performed by the human can be replaced by the robot system 1. That is, the robot system 1 may allow both the first robot 21 and the second robot 22 to perform various kinds of work in cooperation. Note that the robot system 1 may be applied to another usage example in place of the usage examples 1 to 3 of the robot system 1 explained as above.

Modified Example 1 of Embodiment

Figure 11:
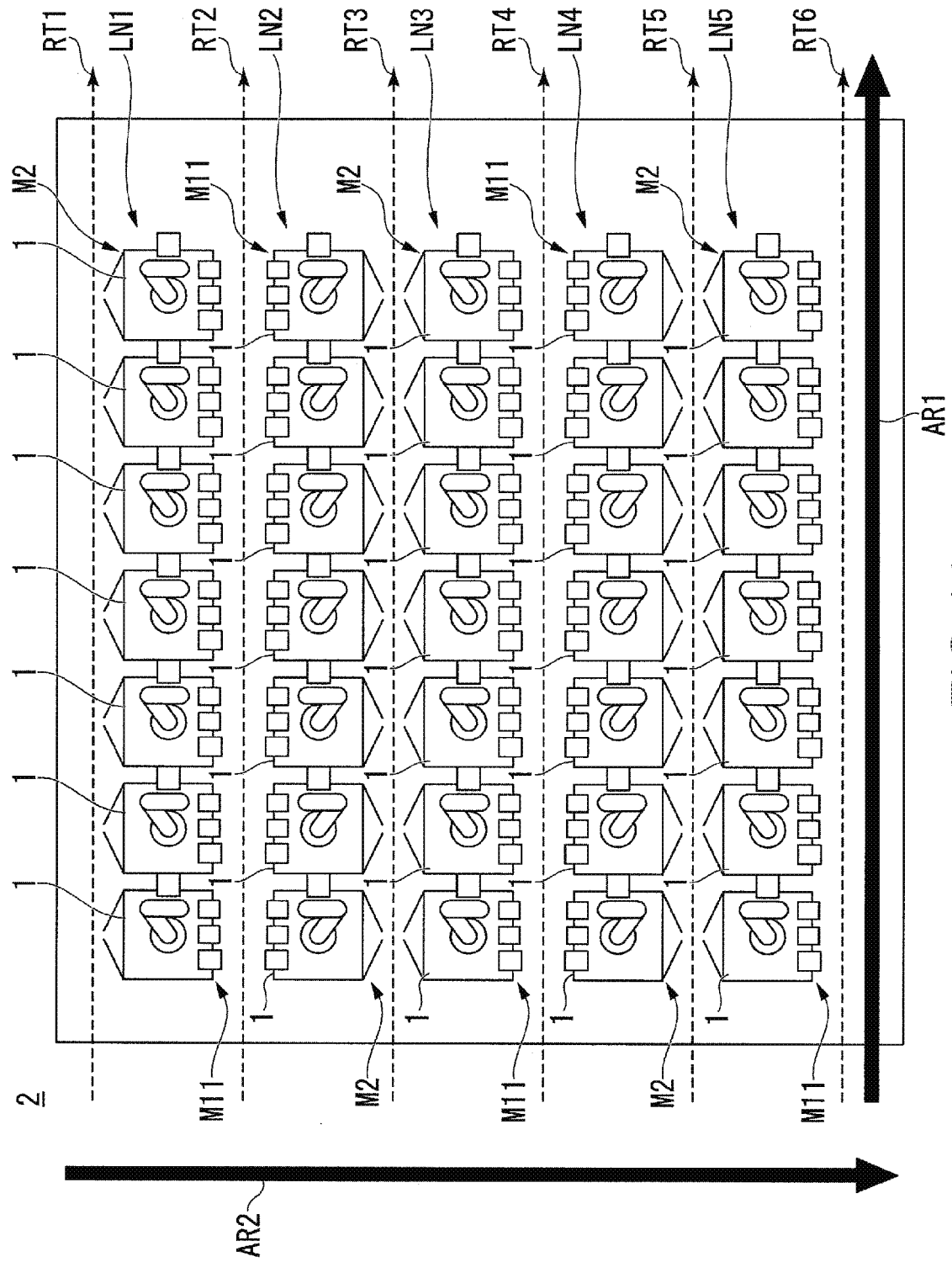
FIG. 11 shows an example of a configuration of a robot system 2 according to modified example 1 of the embodiment.

As below, referring to FIG. 11, modified example 1 of the embodiment will be explained. Note that, in the modified example 1 of the embodiment, the same configuration parts as those of the embodiment have the same signs and their explanation will be omitted. A robot system 2 according to the modified example 1 of the embodiment includes a plurality of production lines including the racks BS (i.e., robot systems 1) explained in the embodiment. As below, as an example, the case where the robot system 2 includes five production lines of first production line LN1 to fifth production line LN5 will be explained. FIG. 11 shows an example of a configuration of the robot system 2 according to the modified example 1 of the embodiment.

Here, in the example, the rack BS of the robot system 1 has the above described feed plane M11 and a work surface M2. The work surface M2 is an opposite surface to the feed plane M11 of the side surfaces of the rack BS. The work surface M2 is a surface on the side on which work on the inside of the rack BS is performed by the human. That is, in the example, the rack BS has the feed plane M11 as a plane on the side on which the work object is fed and the work surface M2 on the side on which the work on the inside of the rack BS is performed by the human. The work is e.g. maintenance of the apparatus provided on the rack BS (e.g. first robot 21, second robot 22, or the like), however, may be other work instead.

The first production line LN1 includes e.g. a plurality of the racks BS (i.e., robot systems 1) as a plurality of first racks. Note that the first production line LN1 may have a configuration in which at least one of the plurality of first racks is the rack BS. Or, part of the plurality of first racks of the first production line LN1 may not include one or both of the first robot 21 and the second robot 22. In the first production line LN1, the respective plurality of first racks are arranged along a first direction. In FIG. 11, the first direction is indicated by a direction shown by an arrow AR1. Further, in the first production line LN1, the plurality of first racks are arranged along the first direction so that the feed planes M11 of the respective plurality of first racks may face toward a side in a second direction as a direction orthogonal to the first direction. That is, the plurality of first racks are arranged along the first direction so that the work surfaces M2 of the respective plurality of first racks may face toward a side in a third direction as an opposite direction to the second direction. In FIG. 11, the second direction is indicated by a direction shown by an arrow AR2.

The second production line LN2 includes e.g. a plurality of the racks BS (i.e., robot systems 1) as a plurality of second racks. Note that the second production line LN2 may have a configuration in which at least one of the plurality of second racks is the rack BS. Or, part of the plurality of second racks of the second production line LN2 may not include one or both of the first robot 21 and the second robot 22. In the second production line LN2, the respective plurality of second racks are arranged along the first direction. Further, in the second production line LN2, the plurality of second racks are arranged along the first direction so that the feed planes M11 of the respective plurality of second racks may face toward the side in the third direction. That is, the plurality of second racks are arranged along the first direction so that the work surfaces M2 of the respective plurality of second racks may face toward the side in the second direction.

The third production line LN3 includes e.g. a plurality of the racks BS (i.e., robot systems 1) as a plurality of third racks. Note that the third production line LN3 may have a configuration in which at least one of the plurality of third racks is the rack BS. Or, part of the plurality of third racks of the third production line LN3 may not include one or both of the first robot 21 and the second robot 22. In the third production line LN3, the respective plurality of third racks are arranged along the first direction. Further, in the third production line LN3, the plurality of third racks are arranged along the first direction so that the feed planes M11 of the respective plurality of third racks may face toward the side in the second direction. That is, the plurality of third racks are arranged along the first direction so that the work surfaces M2 of the respective plurality of third racks may face toward the side in the third direction.

The fourth production line LN4 includes e.g. a plurality of the racks BS (i.e., robot systems 1) as a plurality of fourth racks. Note that the fourth production line LN4 may have a configuration in which at least one of the plurality of fourth racks is the rack BS. Or, part of the plurality of fourth racks of the fourth production line LN4 may not include one or both of the first robot 21 and the second robot 22. In the fourth production line LN4, the respective plurality of fourth racks are arranged along the first direction. Further, in the fourth production line LN4, the plurality of fourth racks are arranged along the first direction so that the feed planes M11 of the respective plurality of fourth racks may face toward the side in the third direction. That is, the plurality of fourth racks are arranged along the first direction so that the work surfaces M2 of the respective plurality of fourth racks may face toward the side in the second direction.

The fifth production line LN5 includes e.g. a plurality of the racks BS (i.e., robot systems 1) as a plurality of fifth racks. Note that the fifth production line LN5 may have a configuration in which at least one of the plurality of fifth racks is the rack BS. Or, part of the plurality of fifth racks of the fifth production line LN5 may not include one or both of the first robot 21 and the second robot 22. In the fifth production line LN5, the respective plurality of fifth racks are arranged along the first direction. Further, in the fifth production line LN5, the plurality of fifth racks are arranged along the first direction so that the feed planes M11 of the respective plurality of fifth racks may face toward the side in the second direction. That is, the plurality of fifth racks are arranged along the first direction so that the work surfaces M2 of the respective plurality of fifth racks may face toward the side in the third direction.

In the robot system 2, the first production line LN1, the second production line LN2, the third production line LN3, the fourth production line LN4, and the fifth production line LN5 are sequentially arranged in the second direction. That is, the feed planes M11 of the first production line LN1 face the feed planes M11 of the second production line LN2. The work surfaces M2 of the second production line LN2 face the work surfaces M2 of the third production line LN3. Further, the feed planes M11 of the third production line LN3 face the feed planes M11 of the fourth production line LN4. The work surfaces M2 of the fourth production line LN4 face the work surfaces M2 of the fifth production line LN5.

The fifth production line LN5 includes e.g. a plurality of the racks BS (i.e., robot systems 1) as a plurality of fifth racks. Note that the fifth production line LN5 may have a configuration in which at least one of the plurality of fifth racks is the rack BS. Or, part of the plurality of fifth racks of the fifth production line LN5 may not include one or both of the first robot 21 and the second robot 22. In the fifth production line LN5, the respective plurality of fifth racks are arranged along the first direction. Further, in the fifth production line LN5, the plurality of fifth racks are arranged along the first direction so that the feed surfaces M11 of the respective plurality of fifth racks may face toward the side in the second direction. That is, the plurality of fifth racks are arranged along the first direction so that the work surfaces M2 of the respective plurality of fifth racks may face toward the side in the third direction.

In the robot system 2, the first production line LN1, the second production line LN2, the third production line LN3, the fourth production line LN4, and the fifth production line LN5 are sequentially arranged in the second direction. That is, the feed surfaces M11 of the first production line LN1 face the feed surfaces M11 of the second production line LN2. The work surfaces M2 of the second production line LN2 face the work surfaces M2 of the third production line LN3. Further, the feed surfaces M11 of the third production line LN3 face the feed surfaces M11 of the fourth production line LN4. The work surfaces M2 of the fourth production line LN4 face the work surfaces M2 of the fifth production line LN5.

In the robot system 2, in the example, the distance between the wall surface on the side in the third direction of the room in which the robot system 2 is installed and the first production line LN1 is a distance equal to or larger than the distance at which the human can move. Note that the distance between them may be another distance at which the human can perform work on the respective insides of the first racks of the first production line LN1 according to some method instead. In the robot system 2, in the example, the distance between the first production line LN1 and the second production line LN2 is a distance equal to or larger than the distance at which the feeder can move. Note that the distance between them may be another distance at which the work objects can be fed to the respective first production line LN1 and second production line LN2 according to some method instead. In the robot system 2, in the example, the distance between the second production line LN2 and the third production line LN3 is a distance equal to or larger than the distance at which the human can move. Note that the distance between them may be another distance at which the human can perform work on the respective inside of the second racks of the second production line LN2 and inside of the third racks of the third production line LN3 according to some method instead. In the robot system 2, in the example, the distance between the third production line LN3 and the fourth production line LN4 is a distance equal to or larger than the distance at which the feeder can move. Note that the distance between them may be another distance at which the work objects can be fed to the respective third production line LN3 and fourth production line LN4 according to some method instead. In the robot system 2, in the example, the distance between the fourth production line LN4 and the fifth production line LN5 is a distance equal to or larger than the distance at which the human can move. Note that the distance between them may be another distance at which the human can perform work on the respective inside of the fourth racks of the fourth production line LN4 and inside of the fifth racks of the fifth production line LN5 according to some method instead. In the robot system 2, in the example, the distance between the fifth production line LN5 and the wall surface on the side in the second direction of the room in which the robot system 2 is installed is a distance equal to or larger than the distance at which the feeder can move. Note that the distance between them may be another distance at which the work objects can be fed to the respective fifth production line LN5 according to some method instead.

In the robot system 2, the respective first production line LN1 to fifth production line LN5 are placed as described above. Thereby, in the robot system 2, the human is moved along respective route RT1, route RT3, route RT5 shown in FIG. 11 and the feeder is moved along respective route RT2, route RT4, route RT6, and therefore, interferences between the human and the feeder may be suppressed. As a result, in the robot system 2, the human may perform work on the insides of the racks of the respective first production line LN1 to fifth production line LN5 without devoting attention to the interferences with the feeder. Further, in the robot system 2, reduction of production efficiency caused by pausing the feeder at each time when the work is performed may be suppressed. In the robot system 2, the respective numbers of the routes in which the feeder moves and the routes in which the human moves may be reduced, and, as a result, the installation area of the robot system 2 may be made smaller. Further, in the robot system 2, the interferences between the feeder and the human are suppressed, and thereby, the movement speed of the feeder may be made faster.

Here, the route RT1 refers to a route in which the human moves to perform work on the insides of the first racks of the first production line LN1. The route RT2 refers to a route in which the feeder moves for feeding work objects to the respective first production line LN1 and second production line LN2. The route RT3 refers to a route in which the human moves to perform work on the insides of the racks of the respective second production line LN2 and third production line LN3 (i.e., the second racks and the third racks). The route RT4 refers to a route in which the feeder moves for feeding work objects to the respective third production line LN3 and fourth production line LN4. The route RT5 refers to a route in which the human moves to perform work on the insides of the racks of the respective fourth production line LN4 and fifth production line LN5 (i.e., the fourth racks and the fifth racks). The route RT6 refers to a route in which the feeder moves for feeding work objects to the fifth production line LN5. The work surface M2 is an example of a surface facing the feed plane.

Note that, in the robot system 2, the first robot 21 and the second robot 22 may be provided at least one of the plurality of first racks, the plurality of second racks, the plurality of third racks, the plurality of fourth racks, and the plurality of fifth racks.

Modified Example 2 of Embodiment

Figure 12:
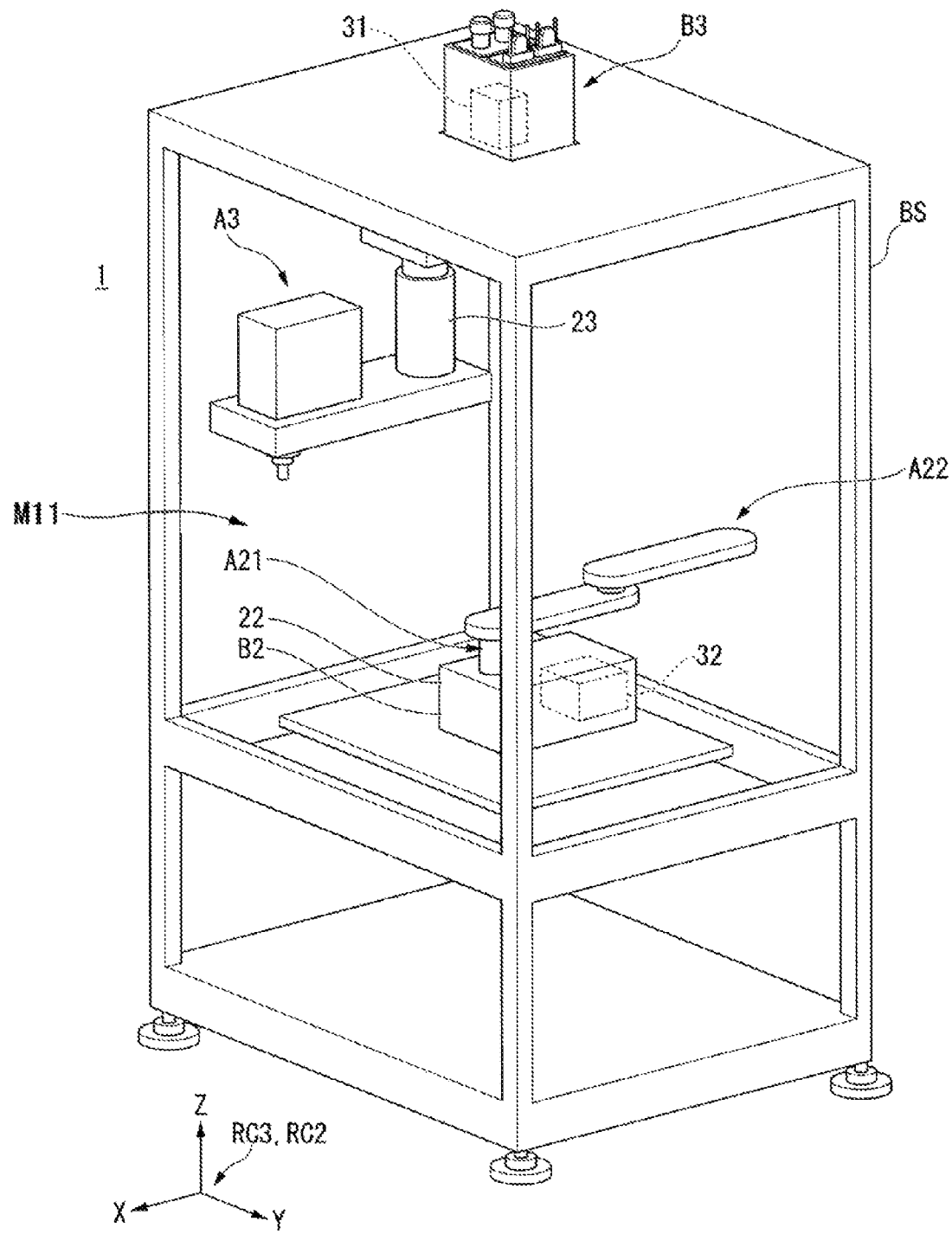
FIG. 12 shows an example of a configuration of the robot system 1 according to modified example 2 of the embodiment.

As below, referring to FIG. 12, modified example 2 of the embodiment will be explained. Note that, in the modified example 2 of the embodiment, the same configuration parts as those of the embodiment have the same signs and their explanation will be omitted. In the modified example 2 of the embodiment, the robot system 1 includes a first robot 23 as a horizontal articulated robot containing the robot control apparatus 31 in place of the first robot 21 as the vertical articulated robot. FIG. 12 shows an example of a configuration of the robot system 1 according to the modified example 2 of the embodiment.

The first robot 23 is a scalar robot. In the example shown in FIG. 12, the first robot 23 is installed on the ceiling board of the above described rack BS.

The first robot 23 includes a base B3 (not shown) and a movable unit A3. The base B3 is placed on the lower surface of the ceiling board of the rack BS so that the entire work region of the first robot 23 may be located below the ceiling board. The movable unit A3 includes a first arm A31 supported rotatably about a first rotation axis AX31 (not shown) by the base B3, a second arm A32 supported rotatably about a second rotation axis AX32 (not shown) by the first arm A31, and a shaft (operation shaft) S supported rotatably about a third rotation axis AX33 (not shown) and translationally in the axis direction of the third rotation axis AX33 by the second arm A32. As below, as an example, the case where the respective first rotation axis AX31 to third rotation axis AX33 are parallel to a Z-axis in a robot coordinate system RC3 as a robot coordinate system of the first robot 23 will be explained. Note that the respective first rotation axis AX31 to third rotation axis AX33 may be non-parallel to the Z-axis.

The shaft S is an axial member in a cylindrical shape. A ball screw groove and a spline groove (not shown) are respectively formed in the circumference surface of the shaft S. The shaft S is provided to penetrate an opposite end portion to the first arm A31 of the end portions of the second arm A32 in the upward and downward directions. Further, in the example, in the shaft S, a flange in a circular disc shape having a larger radius than the radius of the cylinder is provided in the upper end portion of the end portions of the shaft S. The center axis of the cylinder coincides with the center axis of the flange.

An end effector E is provided in the end portion without the flange of the shaft S. The end effector E is communicably connected to the robot control apparatus 31 by a cable. Thereby, the end effector E performs actions according to the control signals acquired from the robot control apparatus 31. Wired communications via the cable are performed according to standards of e.g. Ethernet (registered trademark), USB, or the like. Or, the end effector E may be adapted to be connected to the robot control apparatus 31 via wireless communications performed according to communication standards of Wi-Fi (registered trademark) or the like.

The base B3 includes a first joint (not shown). The above described first rotation axis AX31 refers to the rotation axis of the first joint. The first joint includes an actuator (not shown) and rotates the first arm A31 about the first rotation axis AX31 based on the control signals acquired from the robot control apparatus 31.

The first arm A31 rotates about the first rotation axis AX31 and moves in the horizontal directions.

The second arm A32 includes a second joint (not shown). The above described second rotation axis AX32 refers to the rotation axis of the second joint. The second joint includes an actuator (not shown) and rotates the second arm A32 about the second rotation axis AX32 based on the control signals acquired from the robot control apparatus 31. The second arm A32 rotates about the second rotation axis AX32 and moves in the horizontal directions.

Further, the second arm A32 includes a vertical motion actuator (not shown) and a rotary motion actuator (not shown) and supports the shaft S. The vertical motion actuator rotates a ball screw nut provided in the outer circumference portion of the ball screw groove of the shaft S using a timing belt or the like, and thereby, moves (up and down) the shaft S in the upward and downward directions (i.e., the axis directions of the above described third rotation axis AX33). The rotary motion actuator rotates a ball spline nut provided in the outer circumference portion of the spline groove of the shaft S using a timing belt or the like, and thereby, rotates the shaft S about the center axis of the shaft S (i.e., the above described third rotation axis AX33).

The respective actuators of the first robot 23 are communicably connected to the robot control apparatus 31 by cables. Thereby, the respective actuators perform actions based on control signals acquired from the robot control apparatus 31. Wired communications via the cables are performed according to standards of e.g. Ethernet (registered trademark), USB, or the like. Or, part or all of the actuators may be adapted to be connected to the robot control apparatus via wireless communications performed according to communication standards of Wi-Fi (registered trademark) or the like.

As described above, the robot system 1 according to the modified example 2 of the embodiment includes the first robot 23 in place of the first robot 21. Thereby, the robot system 1 may obtain the same advantages as the embodiment. That is, the robot system 1 may improve the degree of freedom of the work that can be performed with the cooperation of both the first robot 23 and the second robot 22.

As described above, in the robot system 1, the first robot (e.g. the above described first robot 21, first robot 23) can perform work on work objects that can be carried by the second robot (e.g. the above described second robot 22). Thereby, the robot system 1 may improve the degree of freedom of the work that can be performed with the cooperation of both the first robot and the second robot.

Further, in the robot system 1, the vertical articulated robot or horizontal articulated robot can perform work on work objects that can be carried by the second robot. Thereby, the robot system 1 may improve the degree of freedom of the work that can be performed with the cooperation of both the vertical articulated robot or horizontal articulated robot and the second robot.

In the robot system 1, the second movable unit (e.g. the above described second movable unit A22) is rotatable about the first axis (e.g. the above described first rotation axis AX21) with respect to the first movable unit (e.g. the above described first movable unit A21). Thereby, the robot system 1 may improve the degree of freedom of the work that can be performed with the cooperation of both the first robot and the second robot having the second movable unit rotatable about the first axis with respect to the first movable unit.

In the robot system 1, the axis direction of the first axis is the direction along the direction of gravitational force. Thereby, the robot system 1 may improve the degree of freedom of the work that can be performed with the cooperation of both the first robot and the second robot using the first movable unit provided translationally along the direction of gravitational force on the base.

In the robot system 1, the first robot is provided on the first surface (e.g. the lower surface of the ceiling board of the above described rack BS) of the rack (e.g. the above described rack BS), and the second robot is provided on the second surface (e.g. the upper surface of the above described installation board) of the rack. Thereby, the robot system 1 may improve the degree of freedom of the work that can be performed with the cooperation of both the first robot provided on the first surface of the rack and the second robot provided on the second surface of the rack.

In the robot system 1, the base of the second robot (e.g. the above described base B2) is movable. Thereby, the robot system 1 may improve the degree of freedom of the work that can be performed with the cooperation of both the first robot and the second robot using the movable base.

In the robot system 1, the second robot includes the first movable unit in the other part than the end portion on the opposite side to the base of the end portions of the second robot. Thereby, the robot system 1 may further improve the degree of freedom of the work that can be performed with the cooperation of both the first robot and the second robot including the first movable unit in the other part than the end portion on the opposite side to the base of the end portions of the second robot.

In the robot system 1, in the first robot, as seen from the axis direction of the (n+1)th rotation axis (e.g. the above described (n+1)th rotation axis Axn+1, n is an integer of 1 to 5), the nth arm (e.g. the above described nth rotation axis Axn) and the (n+1)th arm can overlap. Thereby, the robot system 1 may allow the first robot in which the nth arm and the (n+1)th arm can overlap as seen from the axis direction of the (n+1)th rotation axis and the second robot to perform various kinds of work.

In the robot system 1, the length of the nth arm is longer than the length of the (n+1)th arm. Thereby, the robot system 1 may further improve the degree of freedom of the work that can be performed with the cooperation of both the first robot in which the length of the nth arm is longer than the length of the (n+1)th arm and the second robot.

In the robot system 1, the nth arm is provided on the base (e.g. the above described base B1) of the first robot. Thereby, the robot system 1 may further improve the degree of freedom of the work that can be performed with the cooperation of both the first robot in which the nth arm is provided on the base and the second robot.

In the robot system 1, the feed plane (e.g. the above described feed plane M11) on which feeding of the first production line (e.g. the above described first production line LN1) is performed faces the feed plane on which feeding of the second production line (e.g. the above described second production line LN2) is performed. Thereby, the robot system 1 may feed to both the first production line and the second production line through between the first production line and the second production line, and, as a result, times for feeding to both the first production line and the second production line may be made shorter.

In the robot system 1, the first robots and the second robots are provided on the plurality of first racks of the first production line and the plurality of second racks of the second production line. Thereby, the robot system 1 may improve the degree of freedom of the work that can be performed with the cooperation of both the first robot and the second robot in each of the plurality of first racks and each of the plurality of second racks.

In the robot system 1, the surface facing the feed plane of the second production line faces the surface (e.g. the above described work surface M2) facing the feed plane on which feeding of the third production line (e.g. the above described third production line LN3) is performed. Thereby, in the robot system 1, the user may perform predetermined work on the respective first production line to third production line without interferences with a human, apparatus, or the like that feed to both the first production line and the second production line.

As above, the embodiments of the invention are described with reference to the drawings, however, the specific configurations are not limited to the embodiments and changes, replacements, deletions, etc. may be made without departing from the scope of the invention.

The entire disclosure of Japanese Patent Application No. 2017-019307, filed Feb. 6, 2017 is expressly incorporated by reference herein.

What is claimed is:

1. A robot system comprising:
a first robot;
a second robot; and
a rack having a ceiling with a first surface and a base with a second surface facing the first surface,
wherein the first robot is provided on the first surface, and the second robot is provided on the second surface,
wherein the second robot has a second robot base fixed on the second surface opposing the ceiling, a shaft provided translationally along an axis direction of a first axis on the second robot base, and an arm provided rotatably with respect to the shaft,
the first robot has a first robot base projecting through the ceiling of the rack,
the first robot is configured to perform work on a work object carried by the second robot,
the second robot is configured to receive the work object in a first position on a first side of a feed plane defined by the rack and manipulate the arm provided on the shaft to move the work object through the feed plane to a second position on a second side of the feed plane, the first robot engaging the work object in the second position,
the first robot has an nth (n is an integer equal to or larger than 1) arm rotatable about an nth rotation axis and an (n+1)th arm provided on the nth arm rotatably about an (n+1)th rotation axis in an axis direction different from an axis direction of the nth rotation axis, and
the (n+1)th arm is configured to rotate in a full circle about the (n+1)th rotation axis without the first robot crossing the feed plane.

2. The robot system according to claim 1, wherein the first robot is a horizontal articulated robot or vertical articulated robot.

3. The robot system according to claim 2, wherein the nth arm and the (n+1)th arm can overlap as seen from the axis direction of the (n+1)th rotation axis.

4. The robot system according to claim 3, wherein a length of the nth arm is longer than a length of the (n+1)th arm.

5. The robot system according to claim 1, wherein the arm is rotatable about the first axis with respect to the shaft.

6. The robot system according to claim 5, wherein
the nth arm and the (n+1)th arm can overlap as seen from the axis direction of the (n+1)th rotation axis.

7. The robot system according to claim 1, wherein the axis direction of the first axis is a direction along a direction of gravitational force.

8. The robot system according to claim 7, wherein
the nth arm and the (n+1)th arm can overlap as seen from the axis direction of the (n+1)th rotation axis.

9. The robot system according to claim 1, wherein the second robot base is movable.

10. The robot system according to claim 9, wherein
the nth arm and the (n+1)th arm can overlap as seen from the axis direction of the (n+1)th rotation axis.

11. The robot system according to claim 1, wherein the shaft of the second robot is disposed between the second robot base and the arm.

12. The robot system according to claim 11, wherein
the nth arm and the (n+1)th arm can overlap as seen from the axis direction of the (n+1)th rotation axis.

13. The robot system according to claim 1, wherein
the nth arm and the (n+1)th arm can overlap as seen from the axis direction of the (n+1)th rotation axis.

14. The robot system according to claim 13, wherein a length of the nth arm is longer than a length of the (n+1)th arm.

15. The robot system according to claim 13, wherein the nth arm (n is 1) is provided on the first robot base.

16. The robot system according to claim 1, further comprising:
a first production line having a first plurality of the rack; and
a second production line having a second plurality of the rack,
wherein the first robot and the second robot are provided on at least one of the first plurality of the rack and the second plurality of the rack, and
a feed plane through which feeding of the first production line is performed faces a feed plane through which feeding of the second production line is performed.

17. The robot system according to claim 16, wherein a plurality of the first robot and a plurality of the second robot are provided on the first plurality of the rack and the second plurality of the rack.

18. The robot system according to claim 16, further comprising a third production line having a plurality of third racks,
wherein a surface facing the feed plane of the second production line faces a surface facing a feed plane on which feeding of the third production line is performed.

19. The robot system according to claim 16, wherein
the nth arm and the (n+1)th arm can overlap as seen from the axis direction of the (n+1)th rotation axis.

20. The robot system according to claim 1, wherein
the nth arm is configured to completely overlap the (n+1)th arm when viewed in the axis direction of the (n+1)th rotation axis, and
the nth arm is configured to rotate in a full circle about the nth rotation axis without the first robot crossing the feed plane.

* * * * *